(12) United States Patent
Liao et al.

(10) Patent No.: US 9,103,962 B2
(45) Date of Patent: Aug. 11, 2015

(54) WIDE-ANGLE OPTICAL LENS ASSEMBLY

(71) Applicant: LARGAN PRECISION CO., LTD., Taichung (TW)

(72) Inventors: Lin-Yao Liao, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 248 days.

(21) Appl. No.: 13/669,449

(22) Filed: Nov. 6, 2012

(65) Prior Publication Data

US 2014/0029115 A1    Jan. 30, 2014

(30) Foreign Application Priority Data

Jul. 24, 2012   (TW) .............................. 101126647 A

(51) Int. Cl.
| | | |
|---|---|---|
| *G02B 9/62* | (2006.01) | |
| *G02B 1/04* | (2006.01) | |
| *G02B 13/06* | (2006.01) | |
| *G02B 13/00* | (2006.01) | |

(52) U.S. Cl.
CPC .............. *G02B 1/04* (2013.01); *G02B 13/0045* (2013.01); *G02B 13/06* (2013.01)

(58) Field of Classification Search
USPC .................. 359/761, 762, 740, 713, 662, 794
See application file for complete search history.

(56) References Cited

U.S. PATENT DOCUMENTS

| | | | |
|---|---|---|---|
| 3,410,632 A | 11/1968 | Woltche | |
| 5,200,861 A | 4/1993 | Moskovich | |
| 5,278,698 A | 1/1994 | Iizuka et al. | |
| 5,682,269 A | 10/1997 | Kimura et al. | |
| 7,957,074 B2 * | 6/2011 | Asami ........................... | 359/713 |
| 2012/0069456 A1 | 3/2012 | Suzuki | |
| 2012/0206822 A1 | 8/2012 | Hsieh et al. | |

FOREIGN PATENT DOCUMENTS

| | | |
|---|---|---|
| CN | 101086552 A | 12/2007 |
| CN | 201348672 Y | 11/2009 |
| CN | 201837770 U | 5/2011 |
| JP | 2004-354572 A | 12/2004 |
| JP | 2012032716 A | 2/2012 |

* cited by examiner

*Primary Examiner* — Alicia M Harrington
(74) *Attorney, Agent, or Firm* — CKC & Partners Co., Ltd.

(57) ABSTRACT

A wide-angle optical lens assembly includes, in order from an object side to an image side, a first lens element, a second lens element, a third lens element, a fourth lens element, a fifth lens element, and a sixth lens element. The first lens element with negative refractive power has a concave image-side surface. The second lens element with refractive power has a concave object-side surface and a convex image-side surface. The third lens element has positive refractive power. The fourth lens element has positive refractive power. The fifth lens element with refractive power has an object-side surface and an image-side surface which both are aspheric. The sixth lens element with refractive power has a convex object-side surface, wherein the object-side surface and an image-side surface thereof are both aspheric. At least one of the second lens element and the fifth lens element has at least one inflection point.

29 Claims, 22 Drawing Sheets

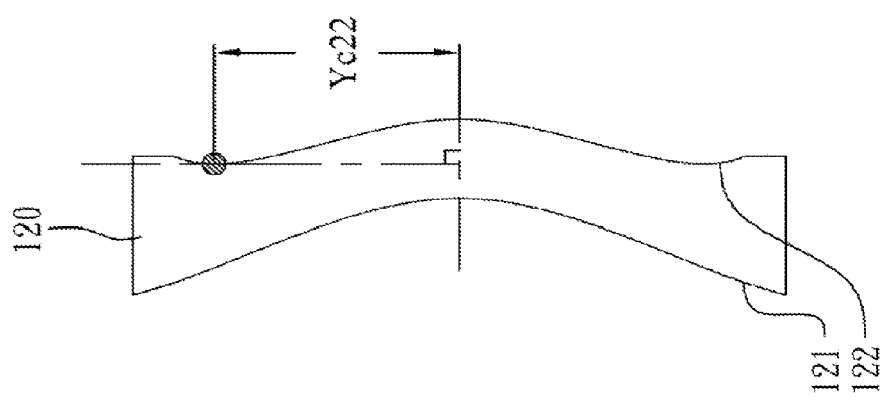

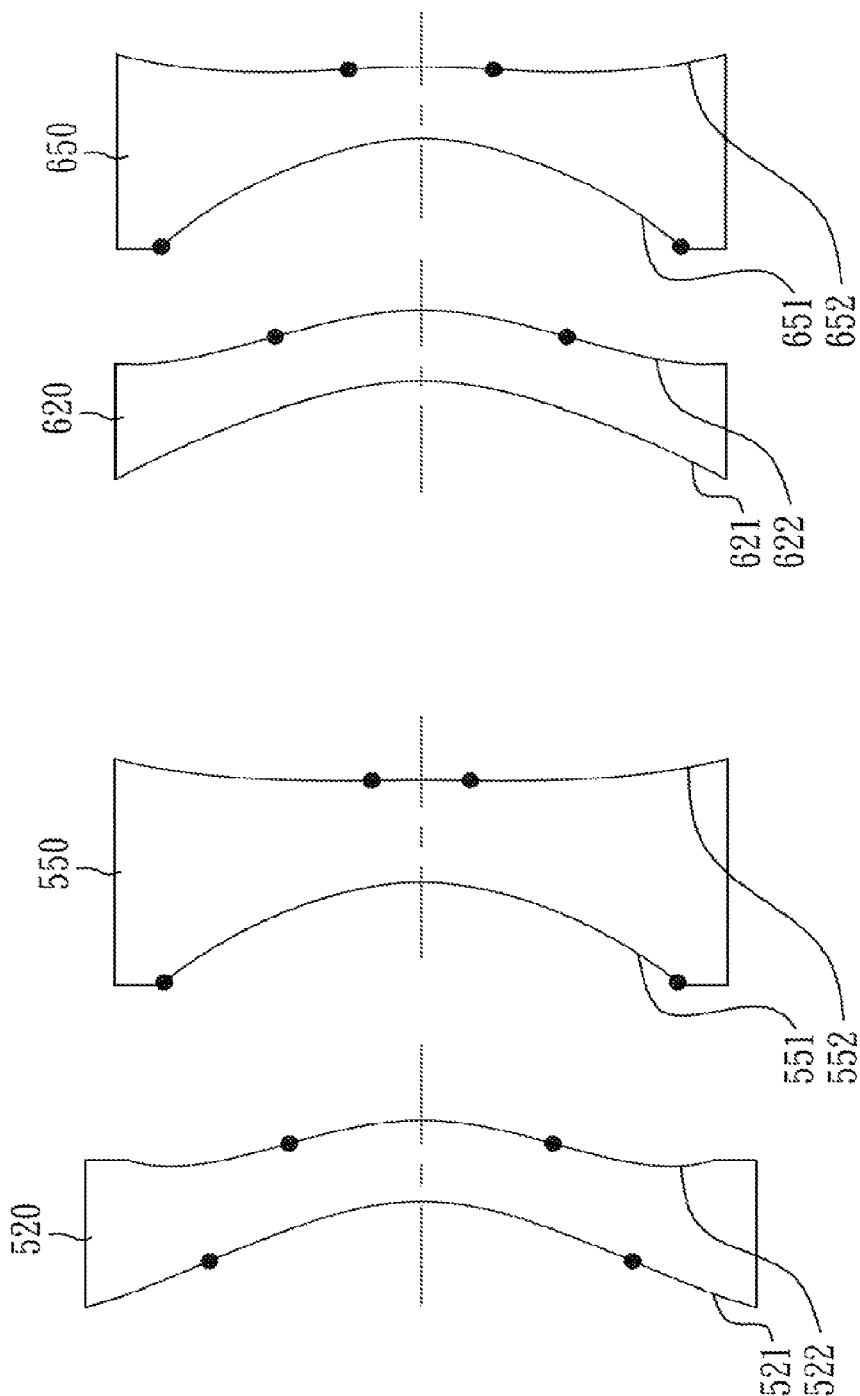

WIDE-ANGLE OPTICAL LENS ASSEMBLY

RELATED APPLICATIONS

This application claims priority to Taiwan Application Serial Number 10126647, filed Jul. 24, 2012, which is herein incorporated by reference.

BACKGROUND

1. Technical Field

The present disclosure relates to a wide-angle optical lens assembly. More particularly, the present disclosure relates to a compact wide-angle optical lens assembly applicable to electronic products.

2. Description of Related Art

In recent years, as the popularity of mobile electronic products with camera functionalities developed, the requirement for miniaturizing an image lens system is increasing. The sensor of a conventional photographing camera is typically a CCD (Charge Coupled Device) image sensor or a CMOS (Complementary Metal-Oxide Semiconductor) sensor. Since the semiconductor manufacturing technologies are advancing, the pixel size of sensors is reducing, and compact image lens system has gradually evolved toward the field of higher megapixels. Therefore, requirements for compact image lens system with better image qualities are expected.

The conventional compact optical systems mounted on the mobile electronic products, such as mentioned in U.S. Pat. No. 8,068,290, typically utilize a four-element lens structure. However, as the high quality portable devices, such as smart phones and PDAs (Personal Digital Assistants), have been in vogue, the pixels and the image qualities of the optical systems are raised quickly. The conventional four-element lens structure, therefore, no longer satisfies the requirements of high quality photograph.

Although the optical systems with five-element lens structure, such as optical systems with five-element lens structure disclosed in U.S. Pat. No. 8,000,030 and U.S. Pat. No. 8,000,031, have been developed recently, the field of view is too insufficient to capture wide-angle images. In addition, as the wide-angle optical systems with five-element lens structure disclosed in US Application No. 2012/0069140, the aberration due to wide-angle is unable to be corrected efficiently by designing the five-element lens. On the other hand, since the insufficient brightness of the surrounded image problem also exists in the five-element lens design, the image quality is unable to be raised efficiently.

SUMMARY

According to one embodiment of present disclosure, a wide-angle optical lens assembly includes, in order from an object side to an image side, a first lens element, a second lens element, a third lens element, a fourth lens element, a fifth lens element, and a sixth lens element. The first lens element with negative refractive power has a concave image-side surface. The second lens element with refractive power has a concave object-side surface and a convex image-side surface. The third lens element has positive refractive power. The fourth lens element has positive refractive power. The fifth lens element with refractive power has an object-side surface and an image-side surface which are both aspheric. The sixth lens element with refractive power has a convex object-side surface. The object-side surface and an image-side surface of the sixth lens element are both aspheric. At least one of the second lens element and the fifth lens element has at least one inflection point on at least one surface thereof. The wide-angle optical lens assembly further includes a stop disposed between the first lens element and the sixth lens element. A composite focal length of the lens elements with refractive power disposed between the stop and an object is ff, a composite focal length of the lens elements with refractive power disposed between the stop and an image plane is fr, a focal length of the wide-angle optical lens assembly is f, a focal length of the third lens element is f3, and the following relationships are satisfied:

$$0 < ff/fr < 3.0; \text{ and}$$

$$0.2 < f/f3 < 1.5.$$

According to another embodiment of present disclosure, a wide-angle optical lens assembly includes, in order from an object side to an image side, a first lens element, a second lens element, a third lens element, a fourth lens element, a fifth lens element, and a sixth lens element. The first lens element with negative refractive power has a concave image-side surface. The second lens element with refractive power has a concave object-side surface and a convex image-side surface. The third lens element has refractive power. The fourth lens element has positive refractive power. The fifth lens element with negative refractive power has a concave object-side surface. The sixth lens element with refractive power has an object-side surface and an image-side surface which are both aspheric. An air distance exists between any two of lens elements with refractive power. The wide-angle optical lens assembly further includes a stop disposed between the first lens element and the sixth lens element. A composite focal length of the lens elements with refractive power disposed between the stop and an object is ff, a composite focal length of the lens elements with refractive power disposed between the stop and an image plane is fr, a central thickness of the first lens element is CT1, a central thickness of the second lens element is CT2, and the following relationships are satisfied:

$$0 < ff/fr < 3.0; \text{ and}$$

$$0.2 < CT2/CT1 < 1.5.$$

According to yet another embodiment of present disclosure, a wide-angle optical lens assembly includes, in order from an object side to an image side, a front lens group, a stop, and a rear lens group. The front lens group with positive refractive power includes, in order from the object side to the image side, a first lens element, a second lens element, and a third lens element. The first lens element with negative power has a concave image-side surface. The second lens element with refractive power has a concave object-side surface and a convex image-side surface. The object-side surface and the image-side surface of the second lens element are both aspheric. The third lens element has refractive power. The rear lens group with positive refractive power includes, in order from the object side to the image side a fourth lens element, a fifth lens element, and a sixth lens element. The fourth lens element with positive refractive power has a convex image-side surface. The fifth lens element with negative refractive power has an object-side surface and an image-side surface which are both aspheric. The sixth lens element with refractive power has an object-side surface and an mage-side surface which are both aspheric. A composite focal length of the lens elements with refractive power disposed between the stop and an object is ff, a composite focal length of the lens elements with refractive power disposed between the stop and an image plane is fr, and the following relationship is satisfied:

$$0 < f/fr < 3.0.$$

BRIEF DESCRIPTION OF THE DRAWINGS

FIG. 18 is a schematic diagram of Yc22 of the image-side surface of the second lens element of the wide-angle optical lens assembly according to the 1st embodiment of the present disclosure;

FIG. 23 is an enlarged view of the second lens element 520 and the fifth lens element 550 of the wide-angle optical lens assembly of FIG. 9;

FIG. 24 is an enlarged view of the second lens element 620 and the fifth lens element 650 of the wide-angle optical lens assembly of FIG. 11;

DETAILED DESCRIPTION

Figure 1:
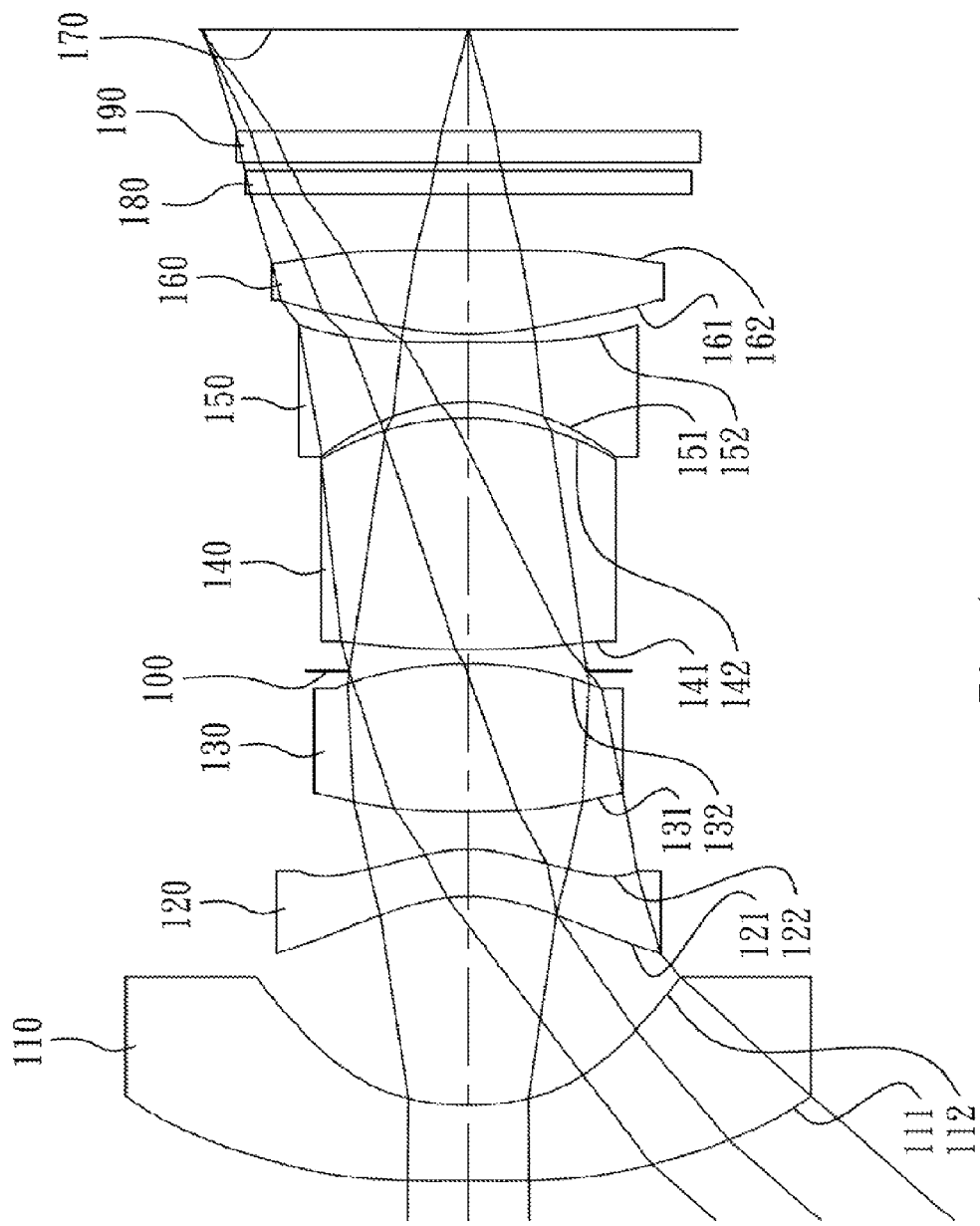
FIG. 1 is a schematic diagram of a wide-angle optical lens assembly according to the 1st embodiment of the present disclosure.

A wide-angle optical lens assembly includes, in order from an object side to an image side, a front lens group, a stop, such as an aperture stop, and a rear lens group. The front lens group includes, in order from the object side to the image side, a first lens element, a second lens element, and a third lens element. The rear lens group includes, in order from the object side to the image side, a fourth lens element, a fifth lens element, and a sixth lens element. An air distance may exist between any two of the first to sixth lens elements.

The front lens group has positive refractive power for reducing the total track length of the wide-angle optical lens assembly.

The rear lens group has positive refractive power for decreasing the high-order aberration of the wide-angle optical lens assembly and reducing the back focal length of the wide-angle optical lens assembly.

More specifically, the first lens element with negative refractive power has a concave image-side surface for enlarging the field of view of the wide-angle optical lens assembly.

The second lens element with refractive power has a concave object-side surface and a convex image-side surface for balancing the aberration caused by the first lens element operated in a large field of view condition and solving problems such as the insufficient brightness of surrounded images. Furthermore, the second lens element can have at least one inflection point on at least one of the surfaces thereof, so that the incident angle of the off-axis field on an image sensor can be effectively minimized, and the aberration of the off-axis field can be corrected as well.

The third lens element with positive refractive power provides a portion of refractive power for the wide-angle optical lens assembly to reduce the total track length thereof.

The fourth lens element with positive refractive power is helpful for the distribution of the positive refractive power of the front lens group and reducing the sensitivity of the wide-angle optical lens assembly. The fourth lens element has a convex image-side surface for adjusting the positive refractive power of the fourth lens element to further reduce the sensitivity of the wide-angle optical lens assembly.

The fifth lens element with negative refractive power may have a concave object-side surface and a convex image-side surface for correcting the aberration of the wide-angle optical lens assembly and adjusting the astigmatism of the wide-angle optical lens assembly. The fifth lens element may have at least one inflection point on the image-side surface thereof, so that the incident angle of the off-axis field on the image sensor can be effectively minimized and the aberration of the off-axis field can be corrected as well.

The sixth lens element with positive refractive power has a convex object-side surface and an image-side surface. The object-side surface and the image-side surface of the sixth lens element are both aspheric. Therefore, a telephoto structure can be formed by the sixth lens element with positive refractive power and the fifth lens element with negative refractive power to reduce the total track length of the wide-angle optical lens assembly.

When a composite focal length of the lens elements with refractive power disposed between the stop and an object is ff, and a composite focal length of the lens elements with refractive power disposed between the stop and an image plane is fr, the following relationship is satisfied:

$$0 < ff/fr < 3.0.$$

Therefore, the refractive power distributions of the lens elements divided by the stop can be adjusted properly to form an entirely lens element configuration with positive refractive power configured on the object-side of the stop, such that the light collection ability of the wide-angle optical lens assembly can be raised, and the excessive back focal length of the wide-angle optical lens assembly can be avoided when the field of view thereof is enlarged.

Furthermore, ff and fr can satisfy the following relationship:

$$0.2 < ff/fr < 0.9,$$

Preferably, ff and fr can satisfy the following relationship:

$$0.3 < ff/fr < 0.7.$$

When a focal length of the wide-angle optical lens assembly is f, and a focal length of the third lens element is f3, the following relationship is satisfied:

$$0.2 < ff/f3 < 1.5.$$

Therefore, the total track length of the wide-angle optical lens assembly can be reduced effectively by adjusting the focal length of the third lens element.

Furthermore, f and f3 can satisfy the following relationship:

$$0.4 < ff/f3 < 0.8.$$

When a curvature radius of the object-side surface of the second lens element is R3, and a curvature radius of the image-side surface of the second lens element is R4, the following relationship is satisfied:

$$-0.3 < (R3-R4)/(R3+R4) < 0.3.$$

By adjusting the surface curvature of the second lens element, the aberration caused by the first lens element operating in large field of view condition can be balanced, and the insufficient brightness of surrounded images problem can be solved.

When a curvature radius of an object-side surface of the third lens element is R5, and a curvature radius of an image-side surface of the third lens element is R6, the following relationship is satisfied:

$$-1.3 < (R5+R6)/(R5-R6) < 1.3.$$

The spherical aberration can be corrected by distributing the surface curvature of the third lens element.

When a curvature radius of an object-side surface of the first lens element is R1, and a curvature radius of the image-side surface of the first lens element is R2, the following relationship is satisfied:

$$0.9 < (R1+R2)/(R1-R2) < 2.0.$$

The field of view of the wide-angle optical lens assembly can be enlarged by distributing the surface curvature of the first lens element properly.

When a curvature radius of the image-side surface of the fourth lens element is R8, and a curvature radius of the object-side surface of the fifth lens element is R9, the following relationship is satisfied:

$$|R9/R8| < 0.9.$$

Therefore, astigmatism and aberration of the wide-angle optical lens assembly can be corrected.

When the focal length of the wide-angle optical lens assembly is distance perpendicular to an optical axis between a critical point on the image-side surface of the second lens element and the optical axis is Yc22, and the following relationship is satisfied:

$$0.1 < Yc22/f < 1.2.$$

Therefore, the incident angle of the off-axis field on the image sensor can be effectively minimized, and the aberration of the off-axis field can be corrected as well.

When the focal length of the wide-angle optical lens assembly is f, and the composite focal length of the lens elements with refractive power disposed between the stop and the object is ff, the following relationship is satisfied:

$$0.4 \leq f/ff < 0.9.$$

The total track length of the wide-angle optical lens assembly can be reduced by adjusting the refractive power of the front lens group.

When an axial distance from the object-side surface of the first lens element to the stop is Dr1s, and an axial distance from the stop to the image-side surface of the sixth lens element is Dsr12, the following relationship is satisfied:

$$0.8 < Dr1s/Dsr12 < 1.5.$$

By adjusting the position of the stop, the field of view of the wide-angle optical lens assembly can be enlarged to enhance the predominance in wide-angle functionality thereof.

When a central thickness of the first lens element is CT1, and a central thickness of the second lens element is CT2, the following relationship is satisfied:

$$0.2 < CT2/CT1 < 1.5.$$

Therefore, the manufacture and the assembling of wide-angle optical lens assembly would be easier with proper thicknesses of the lens elements.

Furthermore, CT1 and CT2 can satisfy the following relationship:

$$0.3 < CT2/CT1 < 0.9.$$

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following relationship is satisfied:

$$0.1 < (T23+T34+T45+T56)/T12 < 0.65.$$

Therefore, by adjusting the axial distances between the lens elements, the manufacture of the wide-angle optical lens assembly can be easier, and the compact size of the wide-angle optical lens assembly can be maintained.

When a distance in parallel with an optical axis between a maximum effective diameter position on the image-side surface of the fourth lens element and a maximum effective diameter position on the object-side surface of the fifth lens element is ET45, and the axial distance between the fourth lens element and the fifth lens element is T45, the following relationship is satisfied:

$$0.05 < ET45/T45 < 0.9.$$

Therefore, the manufacture and the assembling of wide-angle optical lens assembly would be easier by adjusting the distance between the paraxial region and the regions around the effective diameter.

When a maximal field of view of the wide-angle optical lens assembly is FOV, the following relationship is satisfied:

$$80 \text{ degrees} < FOV < 160 \text{ degrees}.$$

Therefore, the wide-angle optical lens assembly can provide larger field of view to capture wide-angle images.

The lens elements of the wide-angle optical lens assembly according to one or more embodiment of present disclosure can be made of plastic material or glass. When the lens elements are made of plastic material, the cost of manufacture can be effectively reduced. On the other hand, the lens element made of glass may extend the flexibility for designing the distribution of the refractive power of the wide-angle optical lens assembly. There are at least half of the lens elements of the wide-angle optical lens assembly according to one or more embodiment of present disclosure made of plastic material. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the wide-angle optical lens assembly can also be reduced.

For the wide-angle optical lens assembly according to one or more embodiment of the present disclosure, when the lens element has a convex surface, it indicates that the paraxial region of the surface is convex, and when the lens element has a concave surface, it indicates that the paraxial region of the surface is concave.

For the wide-angle optical lens assembly according to one or more embodiment of the present disclosure, the wide-angle optical lens assembly can include at least one stop, such as an aperture stop, glare stop, field stop, etc. The position of the aperture stop can be arbitrarily placed in front of the first lens element, among lens elements, or in front of the image plane for reducing stray light while retaining high image quality.

For the wide-angle optical lens assembly according to one or more embodiment of the present disclosure, the aperture stop is disposed between the first lens element and the image plane, i.e. a central aperture, to enlarge the field of view of the wide-angle optical lens assembly, such that the predominance in wide-angle functionality thereof can be enhanced.

The wide-angle optical lens assembly according to one or more embodiment of the present disclosure owns excellent aberration correction and high image quality to be applied to the electronic image systems such as image capture devices for cars, 3D image capture devices, digital cameras, mobile devices, digital pads, and so on.

According to the above description of the present disclosure, the following 1st-8th specific embodiments are provided for further explanation.

First Embodiment

Figure 2:
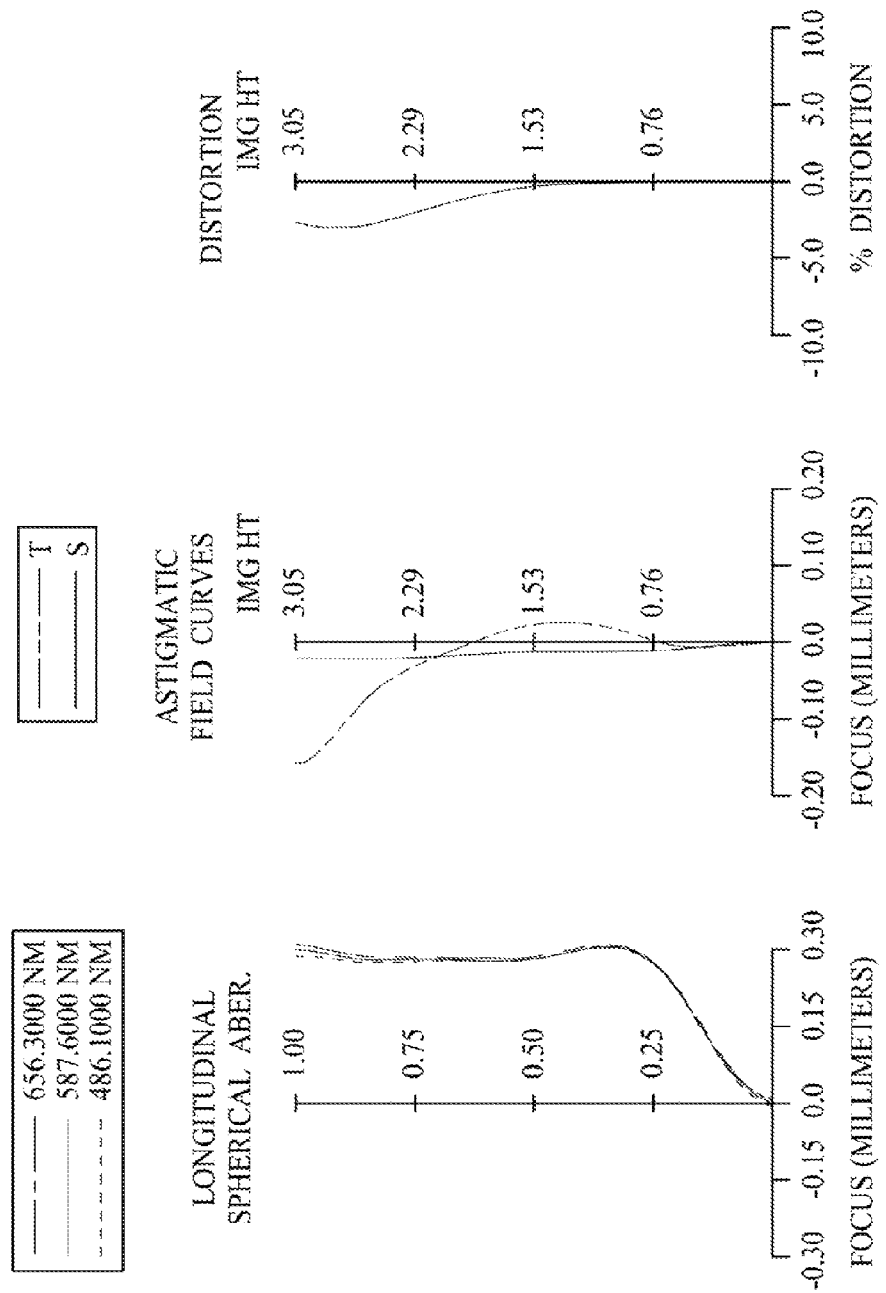
FIG. 2 shows spherical aberration curves, astigmatic field curves and a distortion curve of the wide-angle optical lens assembly according to the 1st embodiment.
Figure 19:
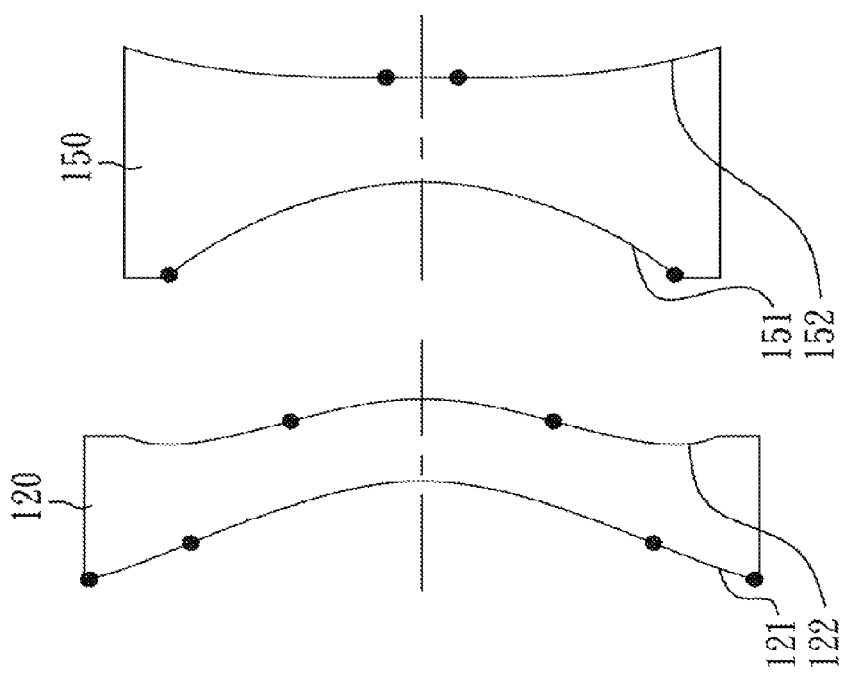
FIG. 19 is an enlarged view of the second lens element 120 and the fifth lens element 150 of the wide-angle optical lens assembly of FIG. 1.

FIG. 1 is a schematic diagram of a wide-angle optical lens assembly according to the 1st embodiment of the present disclosure. FIG. 2 shows spherical aberration curves, astigmatic field curves and a distortion curve of the wide-angle optical lens assembly according to the 1st embodiment. FIG. 19 is an enlarged view of the second lens element 120 and the fifth lens element 150 of the wide-angle optical lens assembly of FIG. 1. In FIG. 1, the wide-angle optical lens assembly includes, in order from an object side to an image side, a first lens element 110, a second lens element 120, a third lens element 130, an aperture stop 100, a fourth lens element 140, a fifth lens element 150, a sixth lens element 160, an IR-cut filter 180, a cover glass 190, and an image plane 170. The first lens element 110, the second lens element 120, and the third lens element 130 are belonged to a front lens group, and the fourth lens element 140, the fifth lens element 150, and the sixth lens element 160 are belonged to a rear lens group.

The first lens element 110 with negative refractive power has a concave object-side surface 111 and a concave image-side surface 112, and is made of plastic material. The object-side surface 111 and the image-side surface 112 of the first lens element 110 are both aspheric.

The second lens element 120 with positive refractive power has a concave object-side surface 121 and a convex image-side surface 122, and is made of plastic material. The object-side surface 121 and the image-side surface 122 of the second lens element 120 are both aspheric. Furthermore, the second lens element 120 has inflection points on the object-side surface 121 and the image-side surface 122 thereof.

The third lens element 130 with positive refractive power has a convex object-side surface 131 and a convex image-side surface 132, and is made of plastic material. The object-side surface 131 and the image-side surface 132 of the third lens element 130 are both aspheric.

The fourth lens element 140 with positive refractive power has a convex object-side surface 141 and a convex image-side surface 142, and is made of glass.

The fifth lens element 150 with negative refractive power has a concave object-side surface 151 and a convex image-side surface 152, and is made of plastic material. The object-side surface 151 and the image-side surface 152 of the fifth lens element 150 are both aspheric. Furthermore, the fifth lens element 150 has inflection points on the object-side surface 151 and the image-side surface 152 thereof.

The sixth lens element 160 with positive refractive power has a convex object-side surface 161 and a concave image-side surface 162, and is made of plastic material. The object-side surface 161 and the image-side surface 162 of the sixth lens element 160 are both aspheric.

The IR-cut filter 180 and the cover glass 190 are disposed between the sixth lens element 160 and the image plane 170 in order, wherein the IR-cut filter 180 is made of glass, and they will not affect the focal length of the wide-angle optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the wide-angle optical lens assembly according to the 1st embodiment, when a focal length of the wide-angle optical lens assembly is f, an f-number of the wide-angle optical lens assembly is Fno, and a half of the maximal field of view of the wide-angle optical lens assembly is HFOV, these parameters have the following values:

f=2.88 mm;

Fno=2.08; and

HFOV=46.3 degrees.

For the wide-angle optical lens assembly according to the 1st embodiment, when a central thickness of the first lens element 110 is CT1, and a central thickness of the second lens element 120 is CT2, the following relationship is satisfied:

CT2/CT1=0.62.

Figure 17:
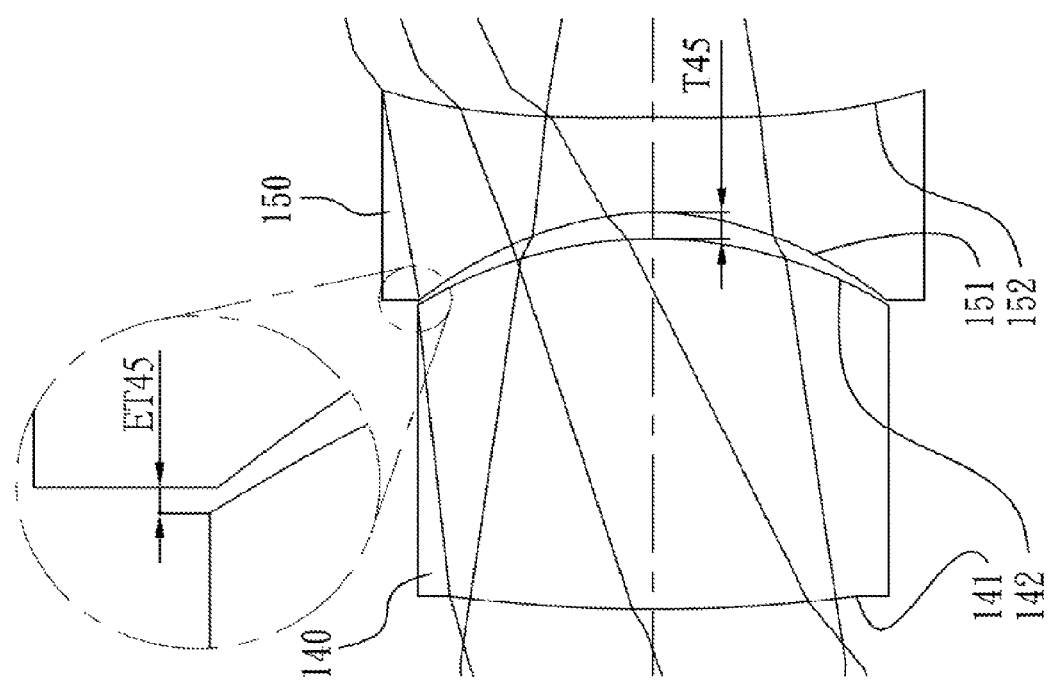
FIG. 17 is a schematic diagram of ET45 between the fourth lens element and the fifth lens element of the wide-angle optical lens assembly according to the 1st embodiment of the present disclosure.

FIG. 17 is a schematic diagram of ET45 between the fourth lens element 140 and the fifth lens element 150 of the wide-angle optical lens assembly according to the 1st embodiment of the present disclosure. In FIG. 17, when a distance in parallel with an optical axis between a maximum effective diameter position on the image-side surface 142 of the fourth lens element 140 and a maximum effective diameter position of the object-side surface 151 on the fifth lens element 150 is ET45, and an axial distance between the fourth lens element 140 and the fifth lens element 150 is T45, the following relationship is satisfied:

ET45/T45=0.20.

For the wide-angle optical lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, the axial distance between the fourth lens element 140 and the fifth lens element 150 is T45, and an axial distance between the fifth lens element 150 and the sixth lens element 160 is T56, the following relationship is satisfied:

(T23+T34+T45+T56)/T12=0.37.

For the wide-angle optical lens assembly according to the 1st embodiment, when a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the image-side surface 142 of the fourth lens element 140 is R8, and a curvature radius of the object-side surface 151 of the fifth lens element 150 is R9, the following relationships are satisfied:

(R1+R2)/(R1−R2)=0.94;

(R3−R4)/(R3+R4)=0.01;

(R5+R6)/(R5−R6)=0.66; and

|R9/R8|=0.58.

For the wide-angle optical lens assembly according to the 1st embodiment, when the focal length of the wide-angle optical lens assembly is f, and a focal length of the third lens element 130 is f3, the following relationship is satisfied:

f/f3=0.48.

For the wide-angle optical lens assembly according to the 1st embodiment, when the focal length of the wide-angle optical lens assembly is f, an effective focal length of all lens elements with refractive power disposed between the aperture stop 100 and an object is ff, and an effective focal length of all lens elements with refractive power disposed between the aperture stop 100 and the image plane 170 is fr, the following relationships are satisfied.

f/ff=0.61; and ff/fr=0.42.

For the wide-angle optical lens assembly according to the 1st embodiment, when an axial distance from the object-side surface 111 of the first lens element 110 to the aperture stop 100 is Dr1s, and an axial distance from the aperture stop 100 to the image-side surface 162 of the sixth lens element 160 is Dsr12, the following relationship is satisfied:

Dr1s/Dsr12=1.21.

FIG. 18 is a schematic diagram of Yc22 of the image-side surface 122 of the second lens element 120 of the wide-angle optical lens assembly according to the 1st embodiment of the present disclosure. In FIG. 18, when a distance perpendicular to an optical axis between a critical point on the image-side surface 122 of the second lens element 120 and the optical axis is Yc22, and the focal length of the wide-angle optical lens assembly is f, the following relationship is satisfied:

Yc22/f=0.57.

For the wide-angle optical lens assembly according to the 1st embodiment, when a maximal field of view of the wide-angle optical lens assembly is FOV, the following relationship is satisfied:

FOV=92.6 degrees.

The detailed optical data of the 1st embodiment are shown in Table 1, and the aspheric surface data are shown in Table 2 below.

TABLE 1

1st Embodiment
f = 2.88 mm, Fno = 2.08, HFOV = 46.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −90.000 (ASP) | 0.936 | Plastic | 1.535 | 56.3 | −5.41 |
| 2 | | 3.000 (ASP) | 2.616 | | | | |
| 3 | Lens 2 | −1.795 (ASP) | 0.583 | Plastic | 1.535 | 56.3 | 25.11 |
| 4 | | −1.763 (ASP) | 0.476 | | | | |
| 5 | Lens 3 | 18.259 (ASP) | 1.853 | Plastic | 1.535 | 56.3 | 5.95 |
| 6 | | −3.719 (ASP) | −0.094 | | | | |
| 7 | Ape. Stop | Plano | 0.269 | | | | |
| 8 | Lens 4 | 10.746 | 2.893 | Glass | 1.620 | 60.3 | 4.11 |
| 9 | | −3.001 | 0.207 | | | | |
| 10 | Lens 5 | −1.731 (ASP) | 0.745 | Plastic | 1.634 | 23.8 | −2.96 |
| 11 | | −26.471 (ASP) | 0.100 | | | | |
| 12 | Lens 6 | 3.175 (ASP) | 1.043 | Plastic | 1.535 | 56.3 | 6.47 |
| 13 | | 34.102 (ASP) | 0.700 | | | | |
| 14 | IR-cut filter | Plano | 0.300 | Glass | 1.517 | 64.2 | — |
| 15 | | Plano | 0.100 | | | | |
| 16 | Cover glass | Plano | 0.400 | Glass | 1.517 | 64.2 | — |
| 17 | | Plano | 1.271 | | | | |
| 18 | Image | Plano | — | | | | |

Note:
Reference wavelength (d-line) is 587.6 nm.

TABLE 2

Aspheric Coefficients

| Surface # | 1 | 2 | 3 | 4 | 5 |
|---|---|---|---|---|---|
| k = | 2.0000E+01 | −1.7802E−01 | −3.5073E+00 | −5.9981E+00 | 1.6818E+01 |
| A4 = | 2.3347E−02 | 3.1012E−02 | 1.2916E−03 | −1.3572E−03 | 6.9472E−02 |
| A6 = | −4.4336E−03 | 3.4042E−03 | 1.6445E−02 | 3.2478E−02 | −4.8827E−02 |
| A8 = | 6.0197E−04 | −5.1168E−03 | −1.5037E−02 | −2.4005E−02 | 2.6037E−02 |
| A10 = | −6.0989E−05 | 2.0862E−03 | 5.9257E−03 | 9.4443E−03 | −1.0871E−02 |
| A12 = | 4.1804E−06 | −5.1714E−04 | −1.1603E−03 | −2.0992E−03 | 3.0732E−03 |
| A14 = | −1.6273E−07 | 6.7406E−05 | 1.1166E−04 | 2.7800E−04 | −5.0763E−04 |
| A16 = | 2.6696E−09 | −3.4076E−06 | −4.2370E−06 | −1.7714E−05 | 3.6551E−05 |

| Surface # | 6 | 10 | 11 | 12 | 13 |
|---|---|---|---|---|---|
| k = | −8.7542E+01 | −5.0812E+00 | 2.0000E+01 | −7.5118E+00 | −7.4629E+01 |
| A4 = | −1.2522E−01 | −6.7369E−03 | 6.4894E−02 | −1.3658E−02 | −2.5890E−02 |
| A6 = | 1.4065E−01 | −3.6347E−02 | −4.3727E−02 | 6.7559E−03 | 1.2484E−02 |
| A8 = | −1.1660E−01 | 4.8990E−02 | 2.8398E−02 | −3.0444E−03 | −6.7195E−03 |
| A10 = | 6.1547E−02 | −3.9732E−02 | −1.4042E−02 | 6.6082E−04 | 2.3740E−03 |
| A12 = | −1.9371E−02 | 1.8125E−02 | 4.4300E−03 | −2.0493E−06 | −5.2327E−04 |
| A14 = | 3.2210E−03 | −4.2956E−03 | −7.6286E−04 | −1.4898E−05 | 6.8098E−05 |
| A16 = | −2.0706E−04 | 4.1328E−04 | 5.4047E−05 | 1.2064E−06 | −3.8424E−06 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. This information related to Table 1 and Table 2 applies also to the Tables for the remaining embodiments, and so an explanation in this regard will not be provided again.

2nd Embodiment

Figure 3:
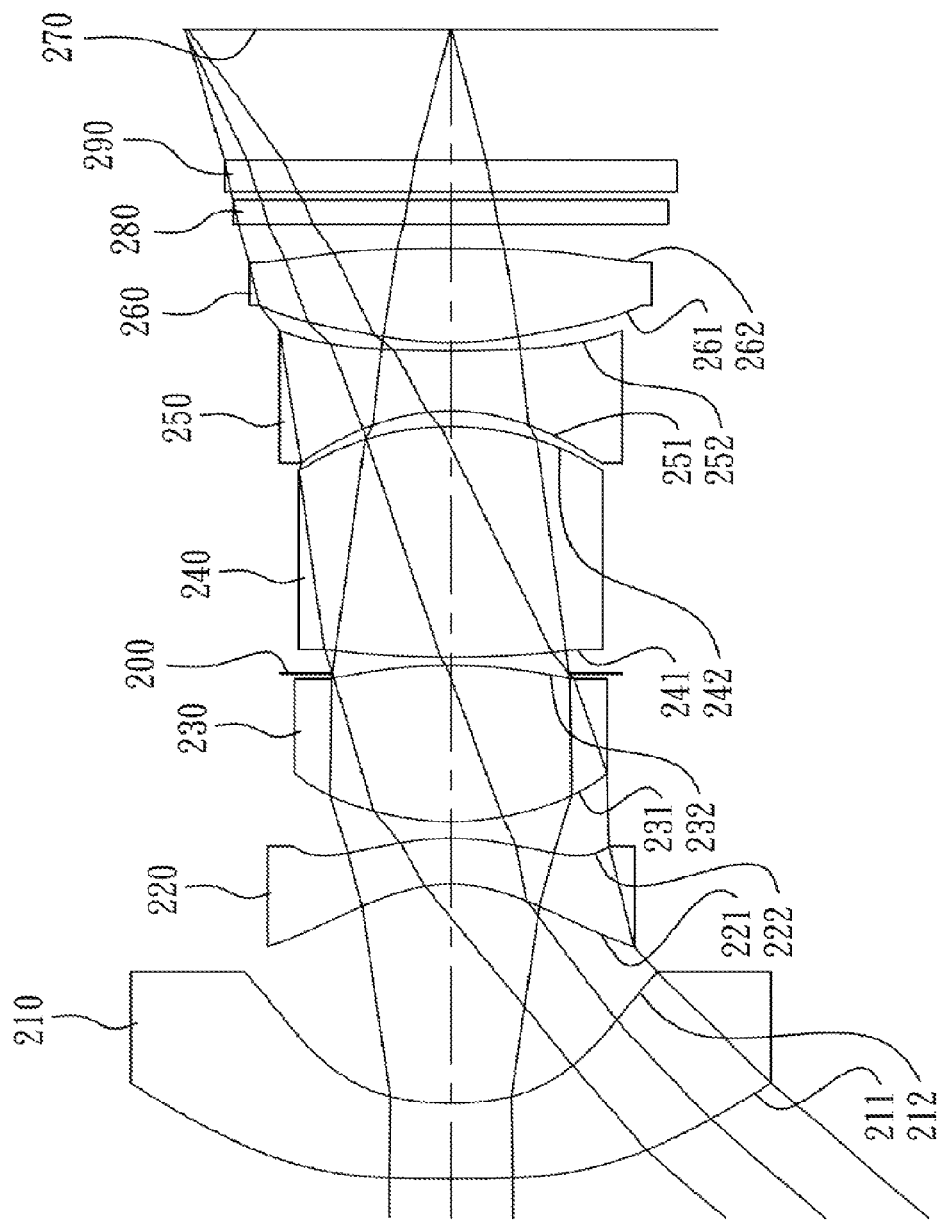
FIG. 3 is a schematic diagram of a wide-angle optical lens assembly according to the 2nd embodiment of the present disclosure.
Figure 4:
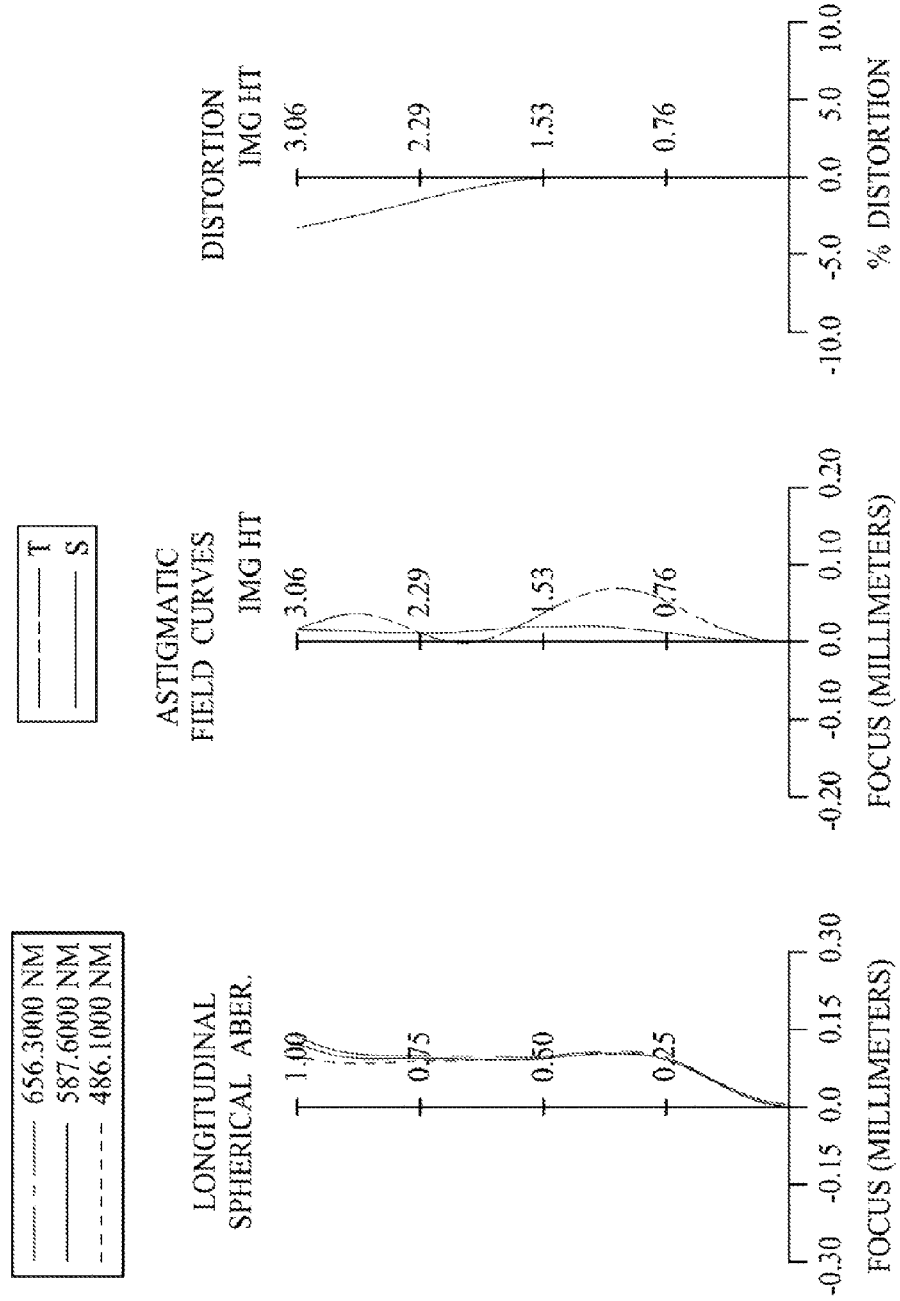
FIG. 4 shows spherical aberration curves, astigmatic field curves and a distortion curve of the wide-angle optical lens assembly according to the 2nd embodiment.
Figure 20:
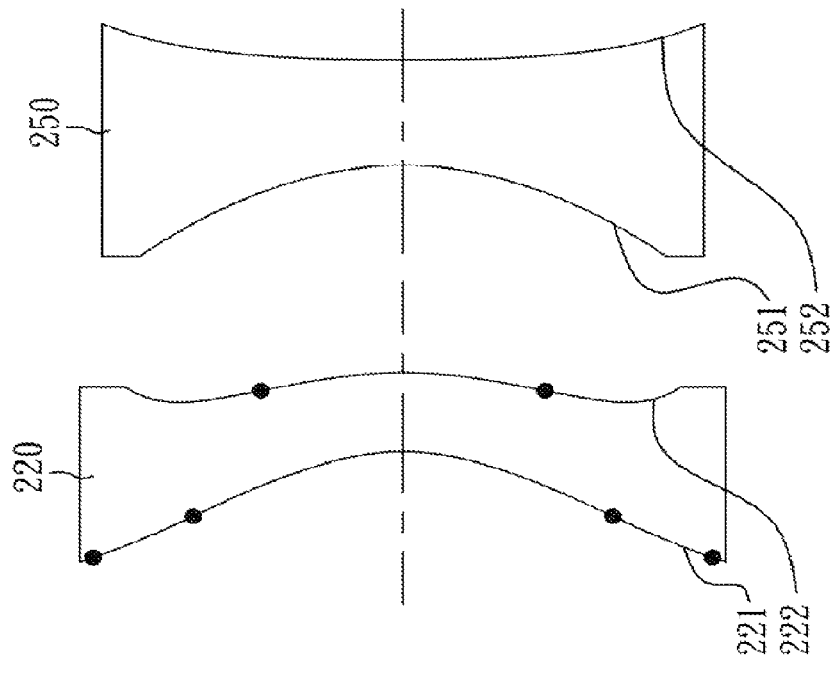
FIG. 20 is an enlarged view of the second lens element 220 and the fifth lens element 250 of the wide-angle optical lens assembly of FIG. 3.

FIG. 3 is a schematic diagram of a wide-angle optical lens assembly according to the 2nd embodiment of the present disclosure. FIG. 4 shows spherical aberration curves, astigmatic field curves and a distortion curve of the wide-angle optical lens assembly according to the 2nd embodiment. FIG. 20 is an enlarged view of the second lens element 220 and the fifth lens element 250 of the wide-angle optical lens assembly of FIG. 3. In FIG. 3, the wide-angle optical lens assembly includes, in order from an object side to an image side, a first lens element 210, a second lens element 220, a third lens element 230, an aperture stop 200, a fourth lens element 240, a fifth lens element 250, a sixth lens element 260, an IR-cut filter 280, a cover glass 290, and an image plane 270. The first lens element 210, the second lens element 220, and the third lens element 230 are belonged to a front lens group, and the fourth lens element 240, the fifth lens element 250, and the sixth lens element 260 are belonged to a rear lens group.

The first lens element 210 with negative refractive power has a convex object-side surface 211 and a concave image-side surface 212, and is made of plastic material. The object-side surface 211 and the image-side surface 212 of the first lens element 210 are both aspheric.

The second lens element 220 with negative refractive power has a concave object-side surface 221 and a convex image-side surface 222, and is made of plastic material. The object-side surface 221 and the image-side surface 222 of the second lens element 220 are both aspheric. Furthermore, the second lens element 220 has inflection points on the object-side surface 221 and the image-side surface 222 thereof.

The third lens element 230 with positive refractive power has a convex object-side surface 231 and a convex image-side surface 232, and is made of plastic material. The object-side surface 231 and the mage-side surface 232 of the third lens element 230 are both aspheric.

The fourth lens element 240 with positive refractive power has a convex object-side surface 241 and a convex image-side surface 242, and is made of glass.

The fifth lens element 250 with negative refractive power has a concave object-side surface 251 and a concave image-side surface 252, and is made of plastic material. The object-side surface 251 and the image-side surface 252 of the fifth lens element 250 are both aspheric.

The sixth lens element 260 with positive refractive power has a convex object-side surface 261 and a convex image-side surface 262, and is made of plastic material. The object-side surface 261 and the image-side surface 262 of the sixth lens element 260 are both aspheric.

The IR-cut filter 280 made of glass is disposed between the sixth lens element 260 and the image plane 270 with the cover glass 290 in order, and they will not affect the focal length of the wide-angle optical lens assembly.

The detailed optical data of the 2nd embodiment are shown in Table 3, and the aspheric surface data are shown in Table 4 below.

TABLE 3

2nd Embodiment
f = 2.95 mm, Fno = 2.08, HFOV = 46.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 68.943 (ASP) | 0.937 | Plastic | 1.535 | 56.3 | −5.90 |
| 2 | | 3.000 (ASP) | 2.755 | | | | |
| 3 | Lens 2 | −1.454 (ASP) | 0.567 | Plastic | 1.535 | 56.3 | −9.15 |
| 4 | | −2.350 (ASP) | 0.208 | | | | |
| 5 | Lens 3 | 3.093 (ASP) | 1.964 | Plastic | 1.535 | 56.3 | 3.96 |
| 6 | | −5.208 (ASP) | −0.104 | | | | |
| 7 | Ape. Stop | Plano | 0.204 | | | | |
| 8 | Lens 4 | 10.801 | 2.890 | Glass | 1.620 | 60.3 | 4.12 |
| 9 | | −3.004 | 0.196 | | | | |
| 10 | Lens 5 | −2.041 (ASP) | 0.752 | Plastic | 1.634 | 23.8 | −2.94 |
| 11 | | 24.180 (ASP) | 0.100 | | | | |
| 12 | Lens 6 | 3.251 (ASP) | 1.182 | Plastic | 1.535 | 56.3 | 5.68 |
| 13 | | −40.399 (ASP) | 0.300 | | | | |
| 14 | IR-cut filter | Plano | 0.300 | Glass | 1.517 | 64.2 | — |
| 15 | | Plano | 0.100 | | | | |
| 16 | Cover glass | Plano | 0.400 | Glass | 1.517 | 64.2 | — |
| 17 | | Plano | 1.646 | | | | |
| 18 | Image | Plano | — | | | | |

Note:
Reference wavelength (d-line) is 587.6 nm.

TABLE 4

Aspheric Coefficients

| Surface # | 1 | 2 | 3 | 4 | 5 |
|---|---|---|---|---|---|
| k = | −1.3114E+01 | 2.0594E−02 | −3.6942E+00 | −1.8191E+01 | −1.4513E−02 |
| A4 = | 2.5870E−02 | 3.7658E−02 | 1.3446E−02 | −1.8305E−02 | 3.5552E−02 |
| A6 = | −4.5013E−03 | 2.7157E−03 | −2.7653E−02 | 2.7452E−02 | −7.4746E−02 |
| A8 = | 5.9642E−04 | −3.5590E−03 | 2.0158E−02 | −2.8489E−02 | 7.1933E−02 |
| A10 = | −6.0910E−05 | 1.2167E−03 | −7.5893E−03 | 2.2812E−02 | −4.0021E−02 |
| A12 = | 4.1847E−06 | −2.7197E−04 | 1.6864E−03 | −9.9564E−03 | 1.3302E−02 |
| A14 = | −1.6236E−07 | 3.0544E−05 | −2.0695E−04 | 2.2767E−03 | −2.4070E−03 |
| A16 = | 2.6386E−09 | −1.2928E−06 | 1.0595E−05 | −2.1022E−04 | 1.8229E−04 |

| Surface # | 6 | 10 | 11 | 12 | 13 |
|---|---|---|---|---|---|
| k = | −3.9893E+01 | −5.4761E+00 | −5.9294E+01 | −1.2527E+01 | −8.4574E−01 |
| A4 = | −2.6587E−02 | −1.6863E−02 | 2.7962E−02 | −7.1830E−03 | −2.0720E−02 |
| A6 = | 2.2136E−03 | −1.8600E−02 | −2.0594E−02 | 6.1848E−03 | 1.1163E−02 |
| A8 = | 1.0961E−02 | 1.9876E−02 | 1.0518E−02 | −6.7753E−03 | −5.8704E−03 |
| A10 = | −9.2717E−03 | −1.1194E−02 | −2.6184E−03 | 3.8922E−03 | 1.9576E−03 |
| A12 = | 3.6474E−03 | 3.7546E−03 | 3.2358E−04 | −1.0588E−03 | −3.7610E−04 |
| A14 = | −6.3834E−04 | −6.9102E−04 | −1.7577E−05 | 1.4109E−04 | 4.2128E−05 |
| A16 = | 3.9974E−05 | 5.4012E−05 | 3.0317E−07 | −7.5584E−06 | −2.1828E−06 |

In the wide-angle optical lens assembly according to the 2nd embodiment, the equation of the aspheric surface and the definitions of f, Fno, HFOV, CT1, CT2, ET45, T12, T23, T34, T45, T56, R1, R2, R3, R4, R5, R6, R8, R9, f3, ff, fr, Dr1s, Dsr12, Yc22 and FOV are the same as those stated in the 1st embodiment with corresponding values for the 2nd embodiment. Moreover, these parameters can be calculated from Tables 3 and 4 as the following values and satisfy the following relationships:

| 2nd embodiment | | | |
|---|---|---|---|
| f (mm) | 2.95 | (R5 + R6)/(R5 − R6) | −0.25 |
| Fno | 2.08 | \|R9/R8\| | 0.68 |
| HFOV (degrees) | 46.7 | f/f3 | 0.74 |
| CT2/CT1 | 0.61 | f/ff | 0.53 |
| ET45/T45 | 0.50 | ff/fr | 0.61 |
| (T23 + T34 + T45 + T56)/T12 | 0.22 | Dr1s/Dsr12 | 1.19 |
| (R1 + R2)/(R1 − R2) | 1.09 | Yc22/f | 0.49 |
| (R3 − R4)/(R3 + R4) | −0.24 | FOV (degrees) | 93.4 |

3rd Embodiment

Figure 5:
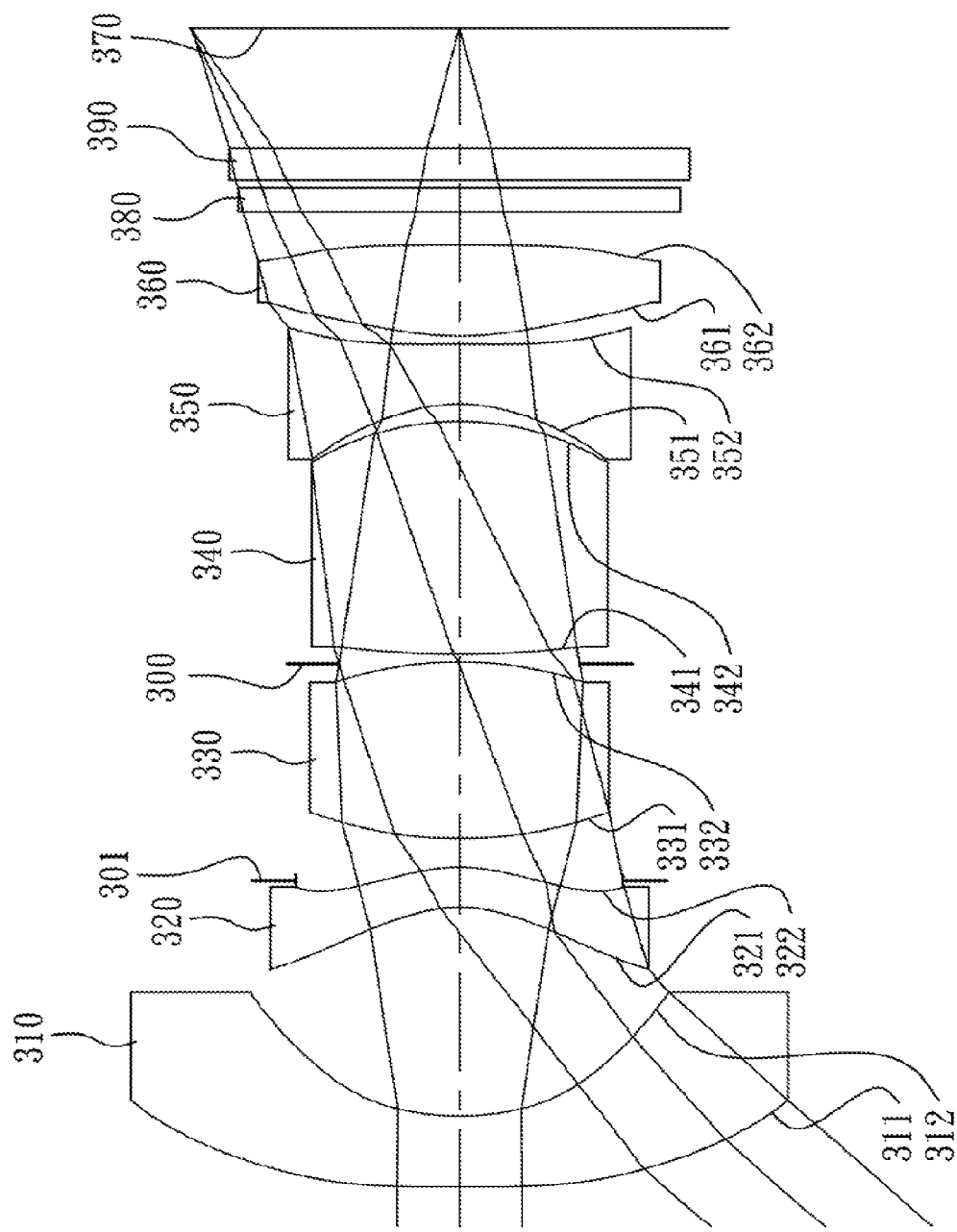
FIG. 5 is a schematic diagram of a wide-angle optical lens assembly according to the 3rd embodiment of the present disclosure.
Figure 6:
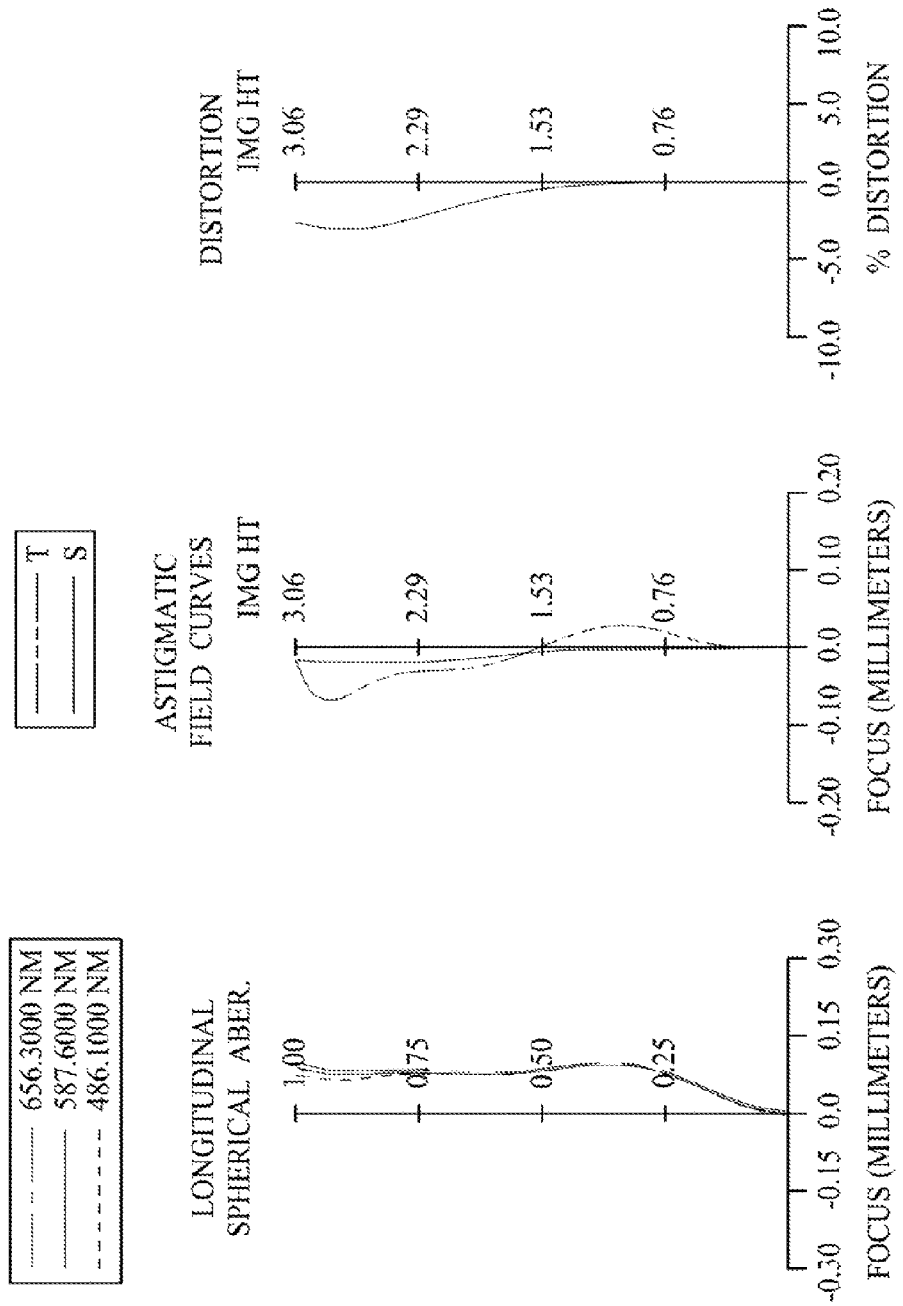
FIG. 6 shows spherical aberration curves, astigmatic field curves and a distortion curve of the wide-angle optical lens assembly according to the 3rd embodiment.
Figure 21:
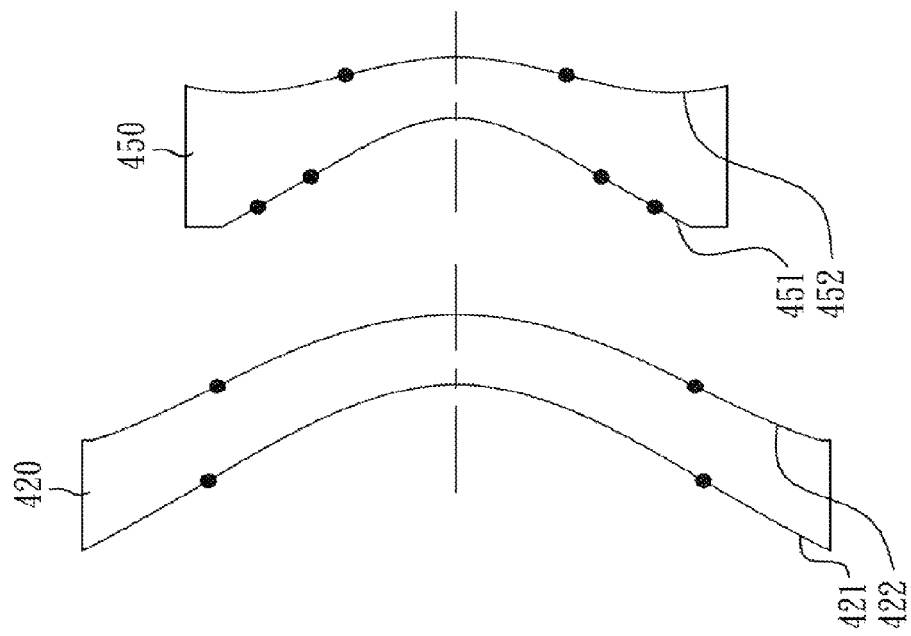
FIG. 21 is an enlarged view of the second lens element 320 and the fifth lens element 350 of the wide-angle optical lens assembly of FIG. 5.

FIG. 5 is a schematic diagram of a wide-angle optical lens assembly according to the 3rd embodiment of the present disclosure. FIG. 6 shows spherical aberration curves, astigmatic field curves and a distortion curve of the wide-angle optical lens assembly according to the 3rd embodiment. FIG. 21 is an enlarged view of the second lens element 320 and the fifth lens element 350 of the wide-angle optical lens assembly of FIG. 5. In FIG. 5, the wide-angle optical lens assembly includes, in order from an object side to an image side, a first lens element 310, a second lens element 320, a stop 301, a third lens element 330, an aperture stop 300, a fourth lens element 340, a fifth lens element 350, a sixth lens element 360, an IR-cut filter 380, a cover glass 390, and an image plane 370. The first lens element 310, the second lens element 320, and the third lens element 330 are belonged to a front lens group, and the fourth lens element 340, the fifth lens element 350, and the sixth lens element 360 are belonged to a rear lens group.

The first lens element 310 with negative refractive power has a concave object-side surface 311 and a concave image-side surface 312, and is made of plastic material. The object-side surface 311 and the image-side surface 312 of the first lens element 310 are both aspheric.

The second lens element 320 with negative refractive power has a concave object-side surface 321 and a convex image-side surface 322, and is made of plastic material. The object-side surface 321 and the image-side surface 322 of the second lens element 320 are both aspheric. Furthermore, the second lens element 320 has inflection points on the object-side surface 321 and the image-side surface 322 thereof.

The third lens element 330 with positive refractive power has a convex object-side surface 331 and a convex image-side surface 332, and is made of plastic material. The object-side surface 331 and the image-side surface 332 of the third lens element 330 are both aspheric.

The fourth lens element 340 with positive refractive power has a convex object-side surface 341 and a convex image-side surface 342, and is made of glass.

The fifth lens element 350 with negative refractive power has a concave object-side surface 351 and a convex image-side surface 352, and is made of plastic material. The object-side surface 351 and the image-side surface 352 of the fifth lens element 350 are both aspheric. Furthermore, the fifth lens element 350 has inflection points on the object-side surface 351 and the image-side surface 352 thereof.

The sixth lens element 360 with positive refractive power has a convex object-side surface 361 and a concave image-side surface 362, and is made of plastic material. The object-side surface 361 and the image-side surface 362 of the sixth lens element 360 are both aspheric.

The IR-cut filter 380 made of glass is disposed between the sixth lens element 360 and the image plane 370 with the cover glass 390 in order, and they will not affect the focal length of the wide-angle optical lens assembly.

The detailed optical data of the 3rd embodiment are shown in Table 5, and the aspheric surface data are shown in Table 6 below.

TABLE 5

3rd Embodiment
f = 2.96 mm, Fno = 2.08, HFOV = 46.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −2739.970 (ASP) | 0.873 | Plastic | 1.535 | 56.3 | −5.60 |
| 2 | | 3.000 (ASP) | 2.598 | | | | |
| 3 | Lens 2 | −1.486 (ASP) | 0.500 | Plastic | 1.535 | 56.3 | −88.90 |
| 4 | | −1.714 (ASP) | −0.170 | | | | |
| 5 | Stop | Plano | 0.522 | | | | |
| 6 | Lens 3 | 6.796 (ASP) | 2.196 | Plastic | 1.535 | 56.3 | 5.13 |
| 7 | | −4.079 (ASP) | −0.024 | | | | |
| 8 | Ape. Stop | Plano | 0.124 | | | | |
| 9 | Lens 4 | 10.801 | 2.890 | Glass | 1.620 | 60.3 | 4.12 |
| 10 | | −3.004 | 0.214 | | | | |
| 11 | Lens 5 | −1.700 (ASP) | 0.744 | Plastic | 1.634 | 23.8 | −2.89 |
| 12 | | −27.625 (ASP) | 0.100 | | | | |
| 13 | Lens 6 | 3.167 (ASP) | 1.133 | Plastic | 1.535 | 56.3 | 6.03 |
| 14 | | 163.218 (ASP) | 0.400 | | | | |
| 15 | IR-cut filter | Plano | 0.300 | Glass | 1.517 | 64.2 | — |
| 16 | | Plano | 0.100 | | | | |
| 17 | Cover glass | Plano | 0.400 | Glass | 1.517 | 64.2 | — |
| 18 | | Plano | 1.495 | | | | |
| 19 | Image | Plano | — | | | | |

Note:
Reference wavelength (d-line) is 587.6 nm.

Note:
The half size of the stop of surface 5 is 1.855 mm.

TABLE 6

Aspheric Coefficients

| Surface # | 1 | 2 | 3 | 4 | 6 |
|---|---|---|---|---|---|
| k = | −9.0000E+01 | −2.7487E−01 | −3.5758E+00 | −6.8497E+00 | 4.7440E+00 |
| A4 = | 2.2827E−02 | 2.9426E−02 | −1.9675E−04 | 1.2227E−02 | 7.5666E−02 |
| A6 = | −4.3687E−03 | 2.6011E−03 | 7.5312E−03 | 1.0629E−02 | −8.2846E−02 |
| A8 = | 6.0361E−04 | −4.4982E−03 | −7.9200E−03 | −9.8785E−03 | 6.0877E−02 |
| A10 = | −6.1039E−05 | 1.8468E−03 | 3.9663E−03 | 4.8238E−03 | −3.0209E−02 |
| A12 = | 4.1757E−06 | −4.5226E−04 | −9.7327E−04 | −1.1799E−03 | 9.3240E−03 |
| A14 = | −1.6285E−07 | 5.8987E−05 | 1.1708E−04 | 1.6254E−04 | −1.5964E−03 |
| A16 = | 2.6863E−09 | −3.0171E−06 | −5.5869E−06 | −1.0672E−05 | 1.1476E−04 |

| Surface # | 7 | 11 | 12 | 13 | 14 |
|---|---|---|---|---|---|
| k = | −2.5690E+01 | −4.7365E+00 | 1.8831E+01 | −8.7738E+00 | 1.1558E+01 |
| A4 = | −3.5763E−02 | −9.6618E−03 | 5.4111E−02 | −1.3526E−02 | −2.1479E−02 |
| A6 = | 2.4671E−03 | −2.5826E−02 | −3.2113E−02 | 9.5080E−03 | 1.0032E−02 |
| A8 = | 1.3892E−02 | 3.4039E−02 | 1.9070E−02 | −6.4841E−03 | −5.7302E−03 |
| A10 = | −1.3405E−02 | −2.6860E−02 | −8.7459E−03 | 2.5277E−03 | 2.0256E−03 |
| A12 = | 5.7217E−03 | 1.2027E−02 | 2.6649E−03 | −5.1473E−04 | −4.3325E−04 |
| A14 = | −1.1475E−03 | −2.8399E−03 | −4.5837E−04 | 5.4914E−05 | 5.4301E−05 |
| A16 = | 8.2737E−05 | 2.7634E−04 | 3.3067E−05 | −2.5346E−06 | −2.9586E−06 |

In the wide-angle optical lens assembly according to the 3rd embodiment, the equation of the aspheric surface and the definitions of f, Fno, HFOV, CT1, CT2, ET45, T12, T23, T34, T45, T56, R1, R2, R3, R4, R5, R6, R8, R9, f3, ff, fr, Dr1s, Dsr12, Yc22 and FOV are the same as those stated in the 1st embodiment with corresponding values for the 3rd embodiment. Moreover, these parameters can be calculated from Tables 5 and 6 as the following values and satisfy the following relationships:

| 3rd embodiment | | | |
|---|---|---|---|
| f (mm) | 2.96 | (R5 + R6)/(R5 − R6) | 0.25 |
| Fno | 2.08 | |R9/R8| | 0.57 |
| HFOV (degrees) | 46.4 | f/f3 | 0.58 |
| CT2/CT1 | 0.57 | f/ff | 0.59 |
| ET45/T45 | 0.20 | ff/fr | 0.47 |
| (T23 + T34 + T45 + T56)/T12 | 0.29 | Dr1s/Dsr12 | 1.25 |
| (R1 + R2)/(R1 − R2) | 1.00 | Yc22/f | 0.54 |
| (R3 − R4)/(R3 + R4) | −0.07 | FOV (degrees) | 92.8 |

4th Embodiment

Figure 7:
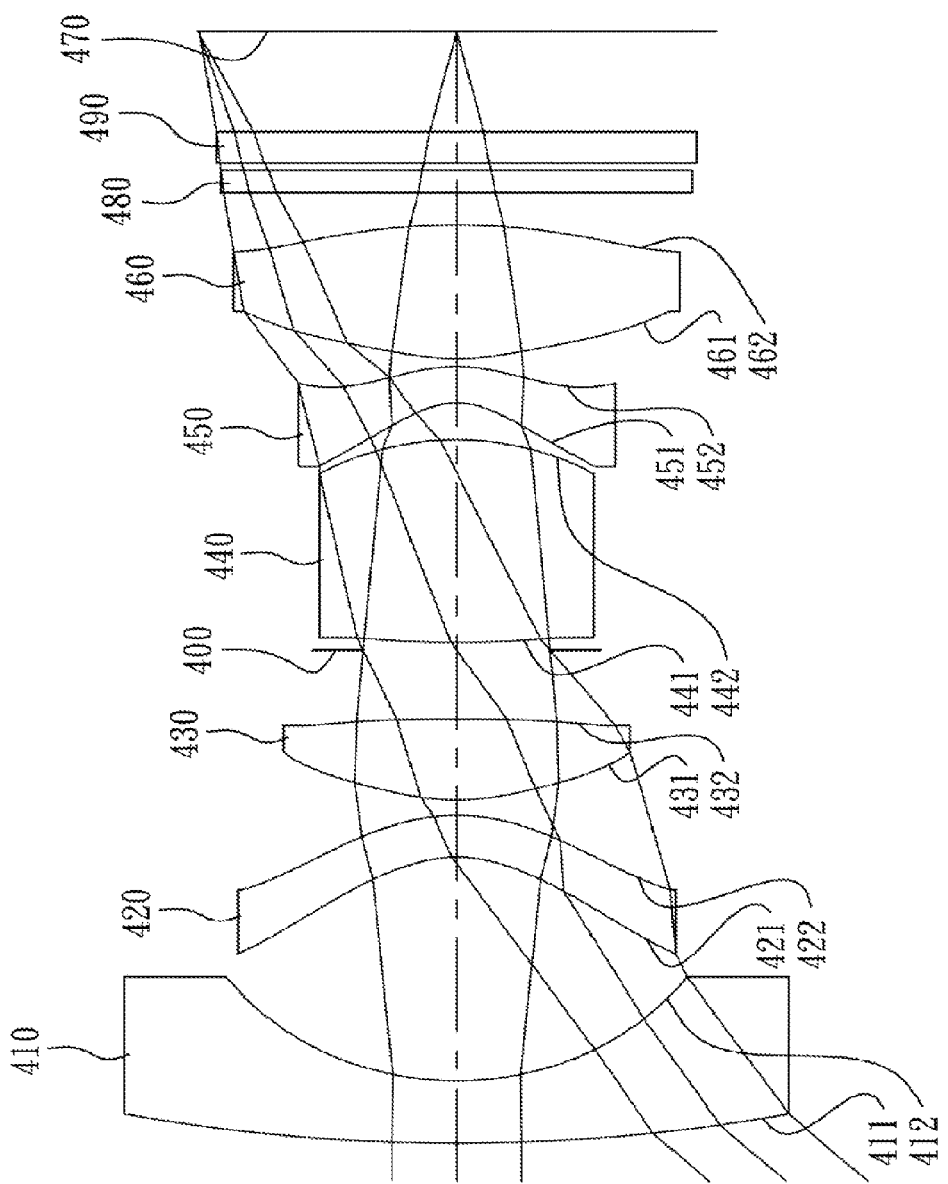
FIG. 7 is a schematic diagram of a wide-angle optical lens assembly according to the 4th embodiment of the present disclosure.
Figure 8:
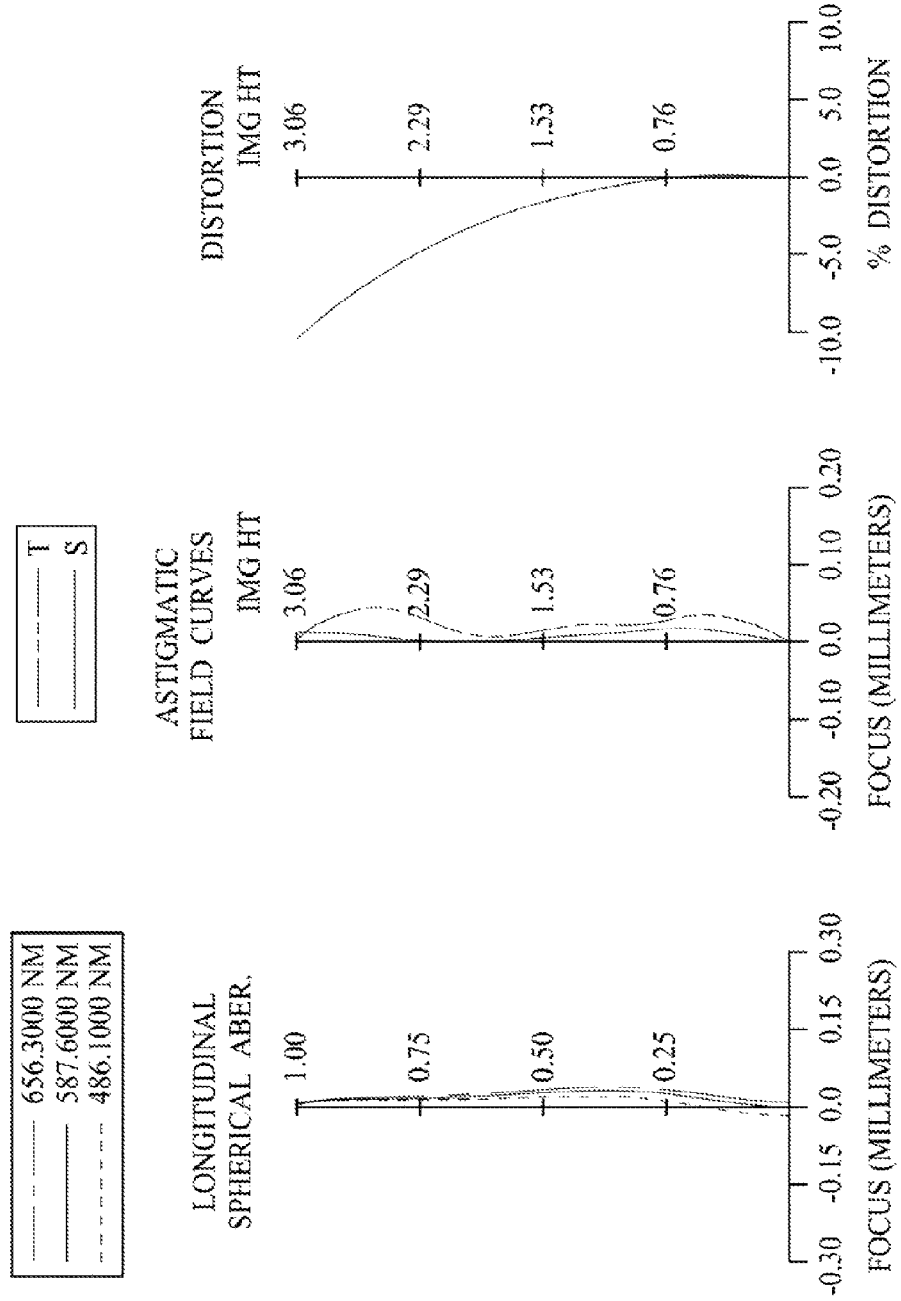
FIG. 8 shows spherical aberration curves, astigmatic field curves and a distortion curve of the wide-angle optical lens assembly according to the 4th embodiment.
Figure 22:
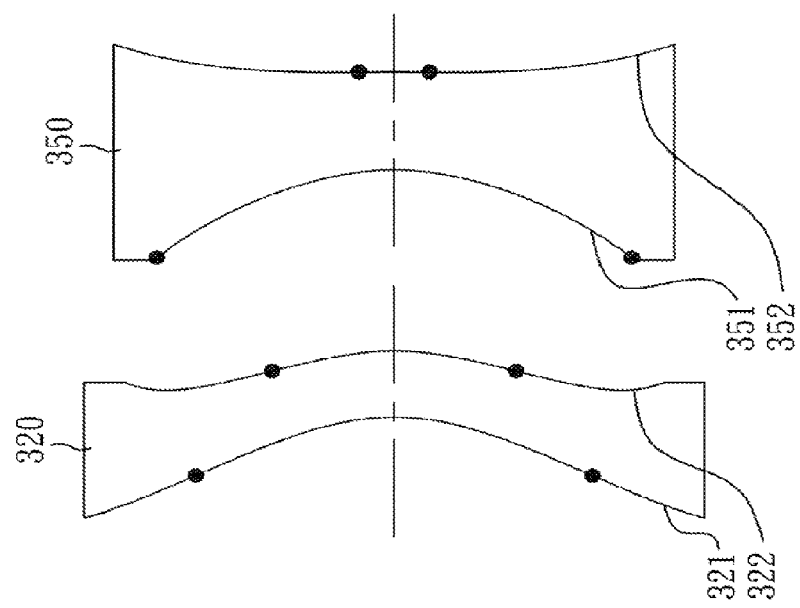
FIG. 22 is an enlarged view of the second lens element 420 and the fifth lens element 450 of the wide-angle optical lens assembly of FIG. 7.

FIG. 7 is a schematic diagram of a wide-angle optical lens assembly according to the 4th embodiment of the present disclosure. FIG. 8 shows spherical aberration curves, astigmatic field curves and a distortion curve of the wide-angle optical lens assembly according to the 4th embodiment. FIG. 22 is an enlarged view of the second lens element 420 and the fifth lens element 450 of the wide-angle optical lens assembly of FIG. 7. In FIG. 7, the wide-angle optical lens assembly includes, in order from an object side to an image side, a first lens element 410, a second lens element 420, a third lens element 430, an aperture stop 400, a fourth lens element 440, a fifth lens element 450, a sixth lens element 460, an IR-cut filter 480, a cover glass 490, and an image plane 470. The first lens element 410, the second lens element 420, and the third lens element 430 are belonged to a front lens group, and the fourth lens element 440, the fifth lens element 450, and the sixth lens element 460 are belonged to a rear lens group.

The first lens element 410 with negative refractive power has a convex object-side surface 411 and a concave image-side surface 412, and is made of glass.

The second lens element 420 with negative refractive power has a concave object-side surface 421 and a convex image-side surface 422, and is made of plastic material. The object-side surface 421 and the image-side surface 422 of the second lens element 420 are both aspheric. Furthermore, the second lens element 420 has inflection points on the object-side surface 421 and the image-side surface 422 thereof.

The third lens element 430 with positive refractive power has a convex object-side surface 431 and a convex image-side surface 432, and is made of plastic material. The object-side surface 431 and the image-side surface 432 of the third lens element 430 are both aspheric.

The fourth lens element 440 with positive refractive power has a convex object-side surface 441 and a convex image-side surface 442, and is made of glass.

The fifth lens element 450 with negative refractive power has a concave object-side surface 451 and a convex image-side surface 452, and is made of plastic material. The object-side surface 451 and the image-side surface 452 of the fifth lens element 450 are both aspheric. Furthermore, the fifth lens element 450 has inflection points on the object-side surface 451 and the image-side surface 452 thereof.

The sixth lens element 460 with positive refractive power has a convex object-side surface 461 and a convex image-side surface 462, and is made of plastic material. The object-side surface 461 and the image-side surface 462 of the sixth lens element 460 are both aspheric.

The IR-cut filter 480 made of glass is disposed between the sixth lens element 460 and the image plane 470 with the cover glass 490 in order, and they will not affect the focal length of the wide-angle optical lens assembly.

The detailed optical data of the 4th embodiment are shown in Table 7, and the aspheric surface data are shown in Table 8 below.

TABLE 7

4th Embodiment
f = 3.19 mm, Fno = 2.08, HFOV = 46.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 20.604 | 0.800 | Glass | 1.487 | 70.4 | −8.59 |
| 2 | | 3.437 | 2.906 | | | | |
| 3 | Lens 2 | −1.372 (ASP) | 0.530 | Plastic | 1.535 | 56.3 | −9.94 |
| 4 | | −2.098 (ASP) | 0.200 | | | | |
| 5 | Lens 3 | 2.467 (ASP) | 1.048 | Plastic | 1.535 | 56.3 | 4.50 |
| 6 | | −84.446 (ASP) | 0.897 | | | | |
| 7 | Ape. Stop | Plano | 0.100 | | | | |
| 8 | Lens 4 | 11.550 | 2.623 | Glass | 1.620 | 60.3 | 4.31 |
| 9 | | −3.175 | 0.479 | | | | |
| 10 | Lens 5 | −0.759 (ASP) | 0.464 | Plastic | 1.634 | 23.8 | −2.84 |
| 11 | | −1.624 (ASP) | 0.100 | | | | |
| 12 | Lens 6 | 2.476 (ASP) | 1.742 | Plastic | 1.535 | 56.3 | 3.63 |
| 13 | | −6.757 (ASP) | 0.400 | | | | |
| 14 | IR-cut filter | Plano | 0.300 | Glass | 1.517 | 64.2 | — |
| 15 | | Plano | 0.100 | | | | |
| 16 | Cover glass | Plano | 0.400 | Glass | 1.517 | 64.2 | — |
| 17 | | Plano | 1.307 | | | | |
| 18 | Image | Plano | — | | | | |

Note:
Reference wavelength (d-line) is 587.6 nm.

TABLE 8

Aspheric Coefficients

| Surface # | 3 | 4 | 5 | 6 |
|---|---|---|---|---|
| k = | −3.9798E+00 | −9.0884E+00 | −4.3425E+00 | 1.7081E+01 |
| A4 = | −1.7353E−02 | −5.3942E−02 | −8.5344E−03 | −7.9297E−03 |
| A6 = | −1.3700E−03 | 1.9618E−02 | −1.5075E−02 | −1.0683E−02 |
| A8 = | 2.5775E−03 | −4.8198E−03 | 1.8183E−02 | 1.1762E−02 |
| A10 = | −6.3828E−04 | 1.0497E−03 | −9.3997E−03 | −5.7196E−03 |
| A12 = | 6.9855E−05 | −1.6239E−04 | 2.9308E−03 | 1.8102E−03 |
| A14 = | −3.4519E−06 | 1.3661E−05 | −5.1766E−04 | −3.7071E−04 |
| A16 = | 5.9178E−08 | −4.4464E−07 | 3.8897E−05 | 3.5600E−05 |

| Surface # | 10 | 11 | 12 | 13 |
|---|---|---|---|---|
| k = | −2.5779E+00 | −7.2770E+00 | −1.0359E+01 | −1.9030E+00 |
| A4 = | −3.1703E−03 | 5.3747E−03 | −2.3354E−02 | −1.4206E−03 |
| A6 = | 3.3446E−02 | 2.6046E−02 | 1.4899E−02 | 3.7708E−03 |
| A8 = | −4.0078E−02 | −1.9346E−02 | −6.1319E−03 | −2.0774E−03 |
| A10 = | 3.0680E−02 | 9.2876E−03 | 1.7108E−03 | 6.4042E−04 |
| A12 = | −1.3607E−02 | −2.4705E−03 | −2.8343E−04 | −1.1780E−04 |
| A14 = | 3.0815E−03 | 3.1136E−04 | 2.5469E−05 | 1.2457E−05 |
| A16 = | −2.7847E−04 | −1.3615E−05 | −9.7059E−07 | −5.6402E−07 |

In the wide-angle optical lens assembly according to the 4th embodiment, the equation of the aspheric surface and the definitions of f, Fno, HFOV, CT1, CT2, ET45, T12, T23, T34, T45, T56, R1, R2, R3, R4, R5, R6, R8, R9, f3, ff, fr, Dr1s, Dsr12, Yc22 and FOV are the same as those stated in the 1st embodiment with corresponding values for the 4th embodiment. Moreover, these parameters can be calculated from Tables 7 and 8 as the following values and satisfy the following relationships:

| 4th embodiment | |
|---|---|
| f (mm) | 3.19 |
| Fno | 2.08 |
| HFOV (degrees) | 46.9 |
| CT2/CT1 | 0.66 |
| ET45/T45 | 0.21 |

| 4th embodiment | |
|---|---|
| (R5 + R6)/(R5 − R6) | −0.94 |
| |R9/R8| | 0.24 |
| f/f3 | 0.71 |
| f/ff | 0.37 |
| ff/fr | 1.64 |
| (T23 + T34 + T45 + T56)/T12 | 0.61 |
| (R1 + R2)/(R1 − R2) | 1.40 |
| (R3 − R4)/(R3 + R4) | −0.21 |
| Dr1s/Dsr12 | 1.16 |
| Yc22/f | — |
| FOV (degrees) | 93.8 |

5th Embodiment

Figure 9:
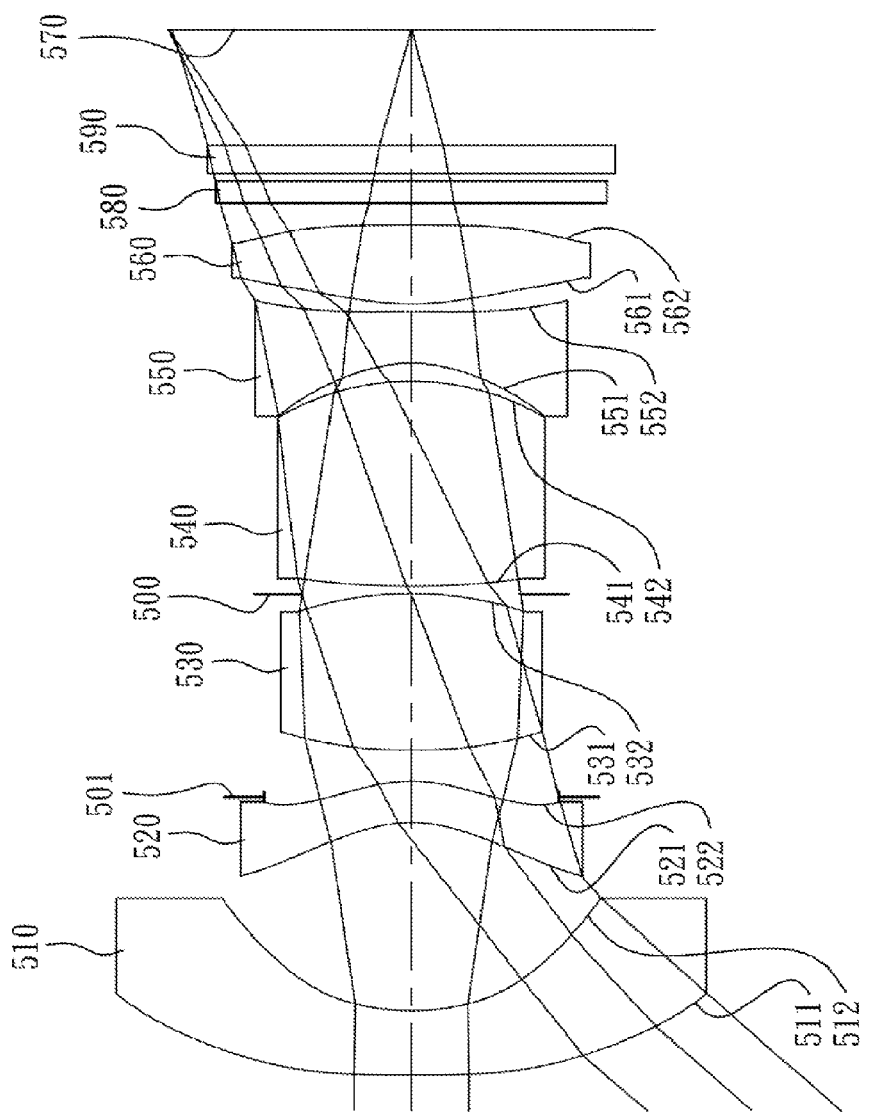
FIG. 9 is a schematic diagram of a wide-angle optical lens assembly according to the 5th embodiment of the present disclosure.
Figure 10:
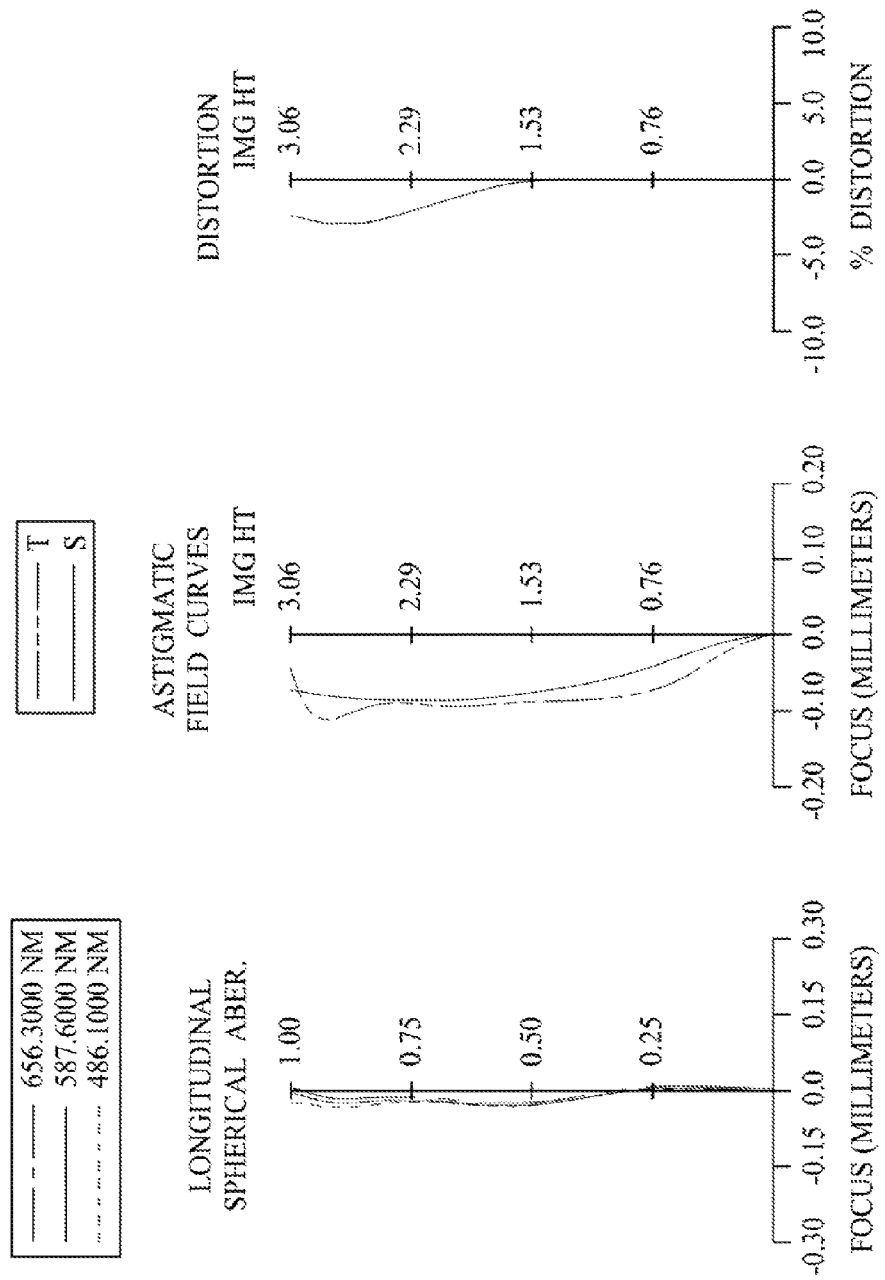
FIG. 10 shows spherical aberration curves, astigmatic field curves and a distortion curve of the wide-angle optical lens assembly according to the 5th embodiment.

FIG. 9 is a schematic diagram of a wide-angle optical lens assembly according to the 5th embodiment of the present disclosure. FIG. 10 shows spherical aberration curves, astigmatic field curves and a distortion curve of the wide-angle optical lens assembly according to the 5th embodiment. FIG. 23 is an enlarged view of the second lens element 520 and the fifth lens element 550 of the wide-angle optical lens assembly of FIG. 9. In FIG. 9, the wide-angle optical lens assembly includes, in order from an object side to an image side, a first lens element 510, a second lens element 520, a stop 501, a third lens element 530, an aperture stop 500, a fourth lens element 540, a fifth lens element 550, a sixth lens element 560, an IR-cut filter 580, a cover glass 590, and an image plane 570. The first lens element 510, the second lens element 520, and the third lens element 530 are belonged to a front lens group, and the fourth lens element 540, the fifth lens element 550, and the sixth lens element 560 are belonged to a rear lens group.

The first lens element 510 with negative refractive power has a convex object-side surface 511 and a concave image-side surface 512, and is made of plastic material. The object-side surface 511 and the image-side surface 512 of the first lens element 510 are both aspheric.

The second lens element 520 with positive refractive power has a concave object-side surface 521 and a convex image-side surface 522, and is made of plastic material. The object-side surface 521 and the image-side surface 522 of the second lens element 520 are both aspheric. Furthermore, the second lens element 520 has inflection points on the object-side surface 521 and the image-side surface 522 thereof.

The third lens element 530 with positive refractive power has a convex object-side surface 531 and a convex image-side surface 532, and is made of plastic material. The object-side surface 531 and the image-side surface 532 of the third lens element 530 are both aspheric.

The fourth lens element 540 with positive refractive power has a convex object-side surface 541 and a convex image-side surface 542, and is made of glass.

The fifth lens element 550 with negative refractive power has a concave object-side surface 551 and a convex image-side surface 552, and is made of plastic material. The object-side surface 551 and the image-side surface 552 of the fifth lens element 550 are both aspheric. Furthermore, the fifth lens element 550 has inflection points on the object-side surface 551 and the image-side surface 552 thereof.

The sixth lens element 560 with positive refractive power has a convex object-side surface 561 and a convex image-side surface 562, and is made of plastic material. The object-side surface 561 and the image-side surface 562 of the sixth lens element 560 are both aspheric.

The IR-cut filter 580 made of glass is disposed between the sixth lens element 560 and the image plane 570 with the cover glass 590 in order, and they will not affect the focal length of the wide-angle optical lens assembly.

The detailed optical data of the 5th embodiment are shown in Table 9, and the aspheric surface data are shown in Table 10 below.

TABLE 9

5th Embodiment
f = 3.00 mm, Fno = 2.08, HFOV = 46.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 100.000 (ASP) | 0.878 | Plastic | 1.535 | 56.3 | −5.80 |
| 2 | | 3.000 (ASP) | 2.598 | | | | |
| 3 | Lens 2 | −1.592 (ASP) | 0.570 | Plastic | 1.535 | 56.3 | 39.32 |
| 4 | | −1.664 (ASP) | −0.220 | | | | |
| 5 | Stop | Plano | 0.642 | | | | |
| 6 | Lens 3 | 12.904 (ASP) | 2.160 | Plastic | 1.535 | 56.3 | 6.17 |
| 7 | | −4.177 (ASP) | −0.011 | | | | |
| 8 | Ape. Stop | Plano | 0.111 | | | | |
| 9 | Lens 4 | 9.801 | 2.821 | Glass | 1.620 | 60.3 | 4.11 |
| 10 | | −3.069 | 0.248 | | | | |
| 11 | Lens 5 | −1.581 (ASP) | 0.716 | Plastic | 1.634 | 23.8 | −2.84 |
| 12 | | −15.161 (ASP) | 0.100 | | | | |
| 13 | Lens 6 | 3.154 (ASP) | 1.087 | Plastic | 1.535 | 56.3 | 5.74 |
| 14 | | −100.000 (ASP) | 0.300 | | | | |
| 15 | IR-cut filter | Plano | 0.300 | Glass | 1.517 | 64.2 | — |
| 16 | | Plano | 0.100 | | | | |
| 17 | Cover glass | Plano | 0.400 | Glass | 1.517 | 64.2 | — |
| 18 | | Plano | 1.594 | | | | |
| 19 | Image | Plano | — | | | | |

Note:
Reference wavelength (d-line) is 587.6 nm.

Note:
The half size of the stop of surface 5 is 1.855 mm.

TABLE 10

Aspheric Coefficients

| Surface # | 1 | 2 | 3 | 4 | 6 |
|---|---|---|---|---|---|
| k = | 8.2456E−01 | −3.5592E−01 | −3.3473E+00 | −4.7400E+00 | 2.0000E+01 |
| A4 = | 2.3352E−02 | 3.1635E−02 | −6.9961E−03 | 2.2548E−02 | 8.5017E−02 |
| A6 = | −4.4336E−03 | 2.0818E−03 | 1.8961E−02 | 4.5611E−03 | −7.8975E−02 |
| A8 = | 6.0322E−04 | −4.3207E−03 | −1.3215E−02 | −3.0782E−03 | 5.5712E−02 |
| A10 = | −6.0935E−05 | 1.7759E−03 | 5.0497E−03 | 6.6750E−04 | −2.7369E−02 |
| A12 = | 4.1834E−06 | −4.3495E−04 | −1.0662E−03 | 1.0156E−04 | 8.3415E−03 |
| A14 = | −1.6274E−07 | 5.6671E−05 | 1.1757E−04 | −4.5737E−05 | −1.4003E−03 |
| A16 = | 2.6559E−09 | −2.8860E−06 | −5.3227E−06 | 3.6738E−06 | 9.7612E−05 |

TABLE 10-continued

| Aspheric Coefficients | | | | | |
|---|---|---|---|---|---|
| Surface # | 7 | 11 | 12 | 13 | 14 |
| k = | −2.3119E+01 | −4.6581E+00 | 2.0000E+01 | −7.0022E+00 | −3.9267E+01 |
| A4 = | −3.1710E−02 | −6.7087E−03 | 6.5134E−02 | −2.0773E−02 | −2.3753E−02 |
| A6 = | 1.2340E−03 | −4.4225E−02 | −4.3657E−02 | 1.2022E−02 | 1.3182E−02 |
| A8 = | 1.3494E−02 | 6.0444E−02 | 2.6041E−02 | −6.9643E−03 | −7.7446E−03 |
| A10 = | −1.3230E−02 | −4.6944E−02 | −1.1643E−02 | 2.2108E−03 | 2.7115E−03 |
| A12 = | 5.7811E−03 | 2.0524E−02 | 3.4033E−03 | −3.5165E−04 | −5.8070E−04 |
| A14 = | −1.1826E−03 | −4.7138E−03 | −5.5576E−04 | 2.9128E−05 | 7.3210E−05 |
| A16 = | 8.6118E−05 | 4.4412E−04 | 3.7835E−05 | −1.1944E−06 | −3.9945E−06 |

In the wide-angle optical lens assembly according to the 5th embodiment, the equation of the aspheric surface and the definitions of f, Fno, HFOV, CT1, CT2, ET45, T12, T23, T34, T45, T56, R1, R2, R3, R4, R5, R6, R8, R9, f3, ff, fr, Dr1s, Dsr12, Yc22 and FOV are the same as those stated in the 1st embodiment with corresponding values for the 5th embodiment. Moreover, these parameters can be calculated from Tables 9 and 10 as the following values and satisfy the following relationships:

| 5th embodiment | | | |
|---|---|---|---|
| f (mm) | 3.00 | (R5 + R6)/(R5 − R6) | 0.51 |
| Fno | 2.08 | |R9/R8| | 0.51 |
| HFOV (degrees) | 46.4 | f/f3 | 0.49 |
| CT2/CT1 | 0.65 | f/ff | 0.56 |
| ET45/T45 | 0.10 | ff/fr | 0.53 |
| (T23 + T34 + T45 + T56)/T12 | 0.33 | Dr1s/Dsr12 | 1.30 |
| (R1 + R2)/(R1 − R2) | 1.06 | Yc22/f | 0.54 |
| (R3 − R4)/(R3 + R4) | −0.02 | FOV (degrees) | 92.8 |

6th Embodiment

Figure 11:
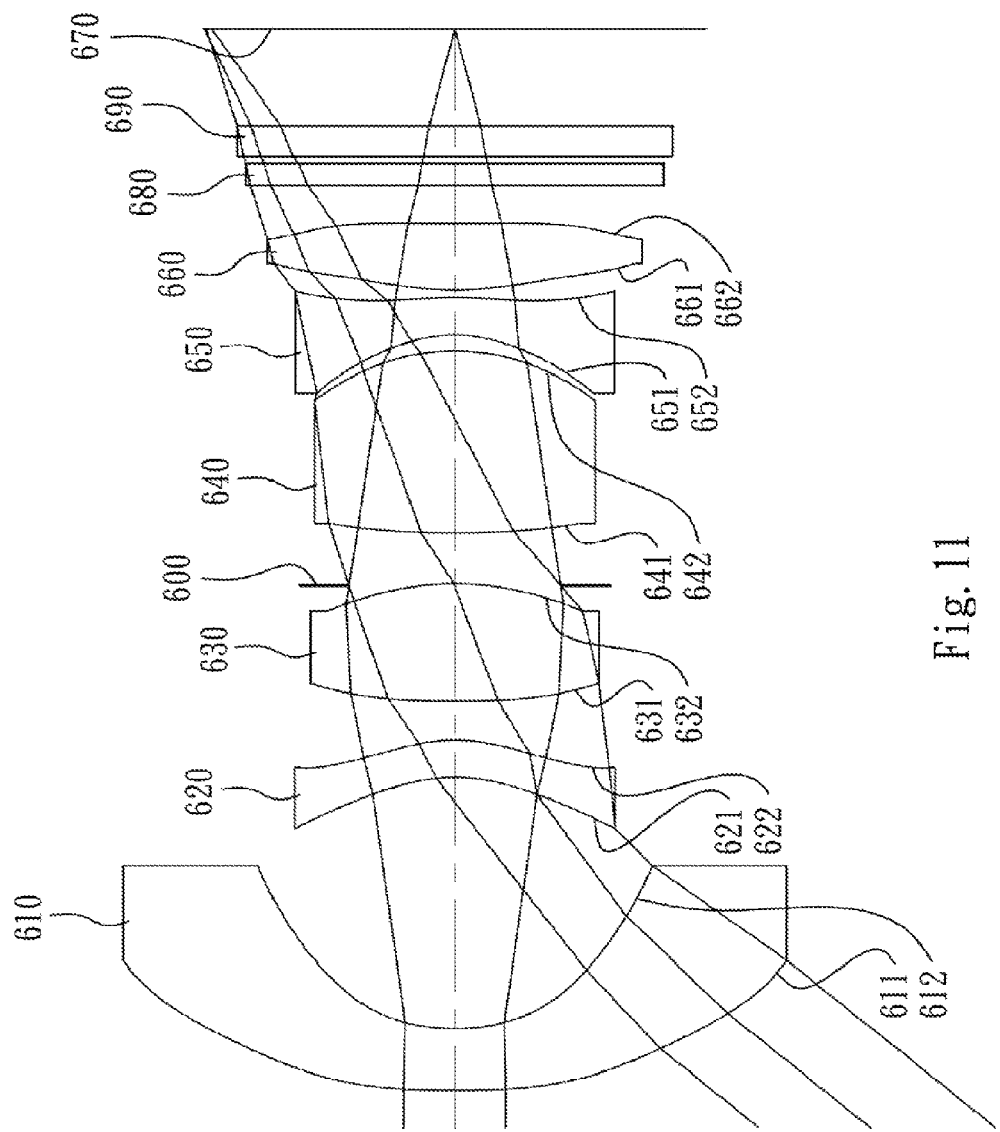
FIG. 11 is a schematic diagram of a wide-angle optical lens assembly according to the 6th embodiment of the present disclosure.
Figure 12:
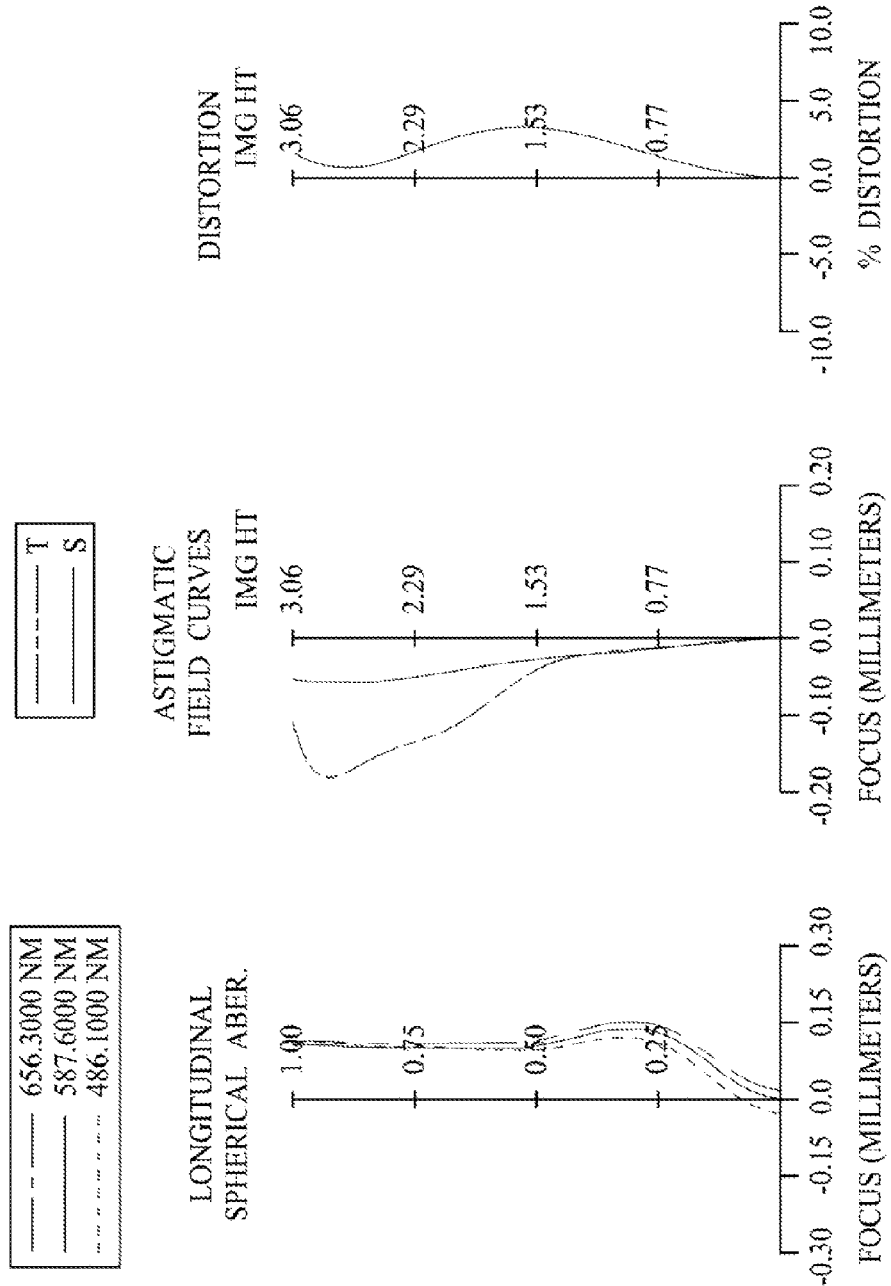
FIG. 12 shows spherical aberration curves, astigmatic field curves and a distortion curve of the wide-angle optical lens assembly according to the 6th embodiment.

FIG. 11 is a schematic diagram of a wide-angle optical lens assembly according to the 6th embodiment of the present disclosure. FIG. 12 shows spherical aberration curves, astigmatic field curves and a distortion curve of the wide-angle optical lens assembly according to the 6th embodiment. FIG. 24 is an enlarged view of the second lens element 620 and the fifth lens element 650 of the wide-angle optical lens assembly of FIG. 11. In FIG. 11, the wide-angle optical lens assembly includes, in order from an object side to an image side, a first lens element 610, a second lens element 620, a third lens element 630, an aperture stop 600, a fourth lens element 640, a fifth lens element 650, a sixth lens element 660, an IR-cut filter 680, a cover glass 690, and an image plane 670. The first lens element 610, the second lens element 620, and the third lens element 630 are belonged to a front lens group, and the fourth lens element 640, the fifth lens element 650, and the sixth lens element 660 are belonged to a rear lens group.

The first lens element 610 with negative refractive power has a convex object-side surface 611 and a concave image-side surface 612, and is made of plastic material. The object-side surface 611 and the image-side surface 612 of the first lens element 610 are both aspheric.

The second lens element 620 with positive refractive power has a concave object-side surface 621 and a convex image-side surface 622, and is made of plastic material. The object-side surface 621 and the image-side surface 622 of the second lens element 620 are both aspheric. Furthermore, the second lens element 620 has inflection points on the image-side surface 622 thereof.

The third lens element 630 with positive refractive power has a convex object-side surface 631 and a convex image-side surface 632, and is made of plastic material. The object-side surface 631 and the image-side surface 632 of the third lens element 630 are both aspheric.

The fourth lens element 640 with positive refractive power has a convex object-side surface 641 and a convex image-side surface 642, and is made of plastic material. The object-side surface 641 and the image-side surface 642 of the fourth lens element 640 are both aspheric.

The fifth lens element 650 with negative refractive power has a concave object-side surface 651 and a convex image-side surface 652, and is made of plastic material. The object-side surface 651 and the image-side surface 652 of the fifth lens element 650 are both aspheric. Furthermore, the fifth lens element 650 has inflection points on the object-side surface 651 and the image-side surface 652 thereof.

The sixth lens element 660 with positive refractive power has a convex object-side surface 661 and a concave image-side surface 662, and is made of plastic material. The object-side surface 661 and the image-side surface 662 of the sixth lens element 660 are both aspheric.

The IR-cut filter 680 made of glass is disposed between the sixth lens element 660 and the image plane 670 with the cover glass 690 in order, and they will not affect the focal length of the wide-angle optical lens assembly.

The detailed optical data of the 6th embodiment are shown in Table 11 and the aspheric surface data are shown in Table 12 below.

TABLE 11

6th Embodiment
f = 2.59 mm, Fno = 2.08, HFOV = 48.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 15.623 (ASP) | 0.820 | Plastic | 1.544 | 55.9 | −5.18 |
| 2 | | 2.342 (ASP) | 3.353 | | | | |

TABLE 11-continued

6th Embodiment
f = 2.59 mm, Fno = 2.08, HFOV = 48.8 deg.

| Surface # | | Curvature Radius | | Thickness | Material | Index | Abbe # | Focal length |
|---|---|---|---|---|---|---|---|---|
| 3 | Lens 2 | −1.840 | (ASP) | 0.500 | Plastic | 1.607 | 26.6 | 24.70 |
| 4 | | −1.807 | (ASP) | 0.525 | | | | |
| 5 | Lens 3 | 37.768 | (ASP) | 1.558 | Plastic | 1.535 | 56.3 | 5.63 |
| 6 | | −3.224 | (ASP) | −0.024 | | | | |
| 7 | Ape. Stop | Plano | | 0.706 | | | | |
| 8 | Lens 4 | 10.623 | (ASP) | 2.421 | Plastic | 1.535 | 56.3 | 4.05 |
| 9 | | −2.504 | (ASP) | 0.221 | | | | |
| 10 | Lens 5 | −1.350 | (ASP) | 0.500 | Plastic | 1.650 | 21.4 | −3.15 |
| 11 | | −4.558 | (ASP) | 0.100 | | | | |
| 12 | Lens 6 | 3.288 | (ASP) | 0.887 | Plastic | 1.535 | 56.3 | 7.01 |
| 13 | | 24.312 | (ASP) | 0.500 | | | | |
| 14 | IR-cut filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 1.302 | | | | |
| 18 | Image | Plano | | — | | | | |

Note:
Reference wavelength (d-line) is 587.6 nm.

TABLE 12

Aspheric Coefficients

| | Surface # | | | | |
|---|---|---|---|---|---|
| 1 | 2 | 3 | 4 | 5 | 6 |
| k = 2.1543E+00 | −4.3859E−01 | −3.5542E+00 | −5.7257E+00 | −1.3481E+01 | −4.8917E+01 |
| A4 = 2.3161E−02 | 3.3372E−02 | 1.1560E−02 | −4.5402E−03 | 6.8148E−02 | −1.2746E−01 |
| A6 = −4.4684E−03 | 3.4935E−03 | 1.6030E−02 | 3.2199E−02 | −4.8600E−02 | 1.4055E−01 |
| A8 = 6.0056E−04 | −4.9929E−03 | −1.5176E−02 | −2.40303E−02 | 2.6300E−02 | −1.1578E−01 |
| A10 = −6.0976E−05 | 2.0951E−03 | 5.9082E−03 | 9.3948E−03 | −1.0792E−02 | 6.1473E−02 |
| A12 = 4.1882E−06 | −5.1935E−04 | −1.1600E−03 | −2.0992E−03 | 3.0732E−03 | −1.9372E−02 |
| A14 = −1.6254E−07 | 6.7420E−05 | 1.1167E−04 | 2.7798E−04 | −5.0765E−04 | 3.2207E−03 |
| A16 = 2.6631E−09 | −3.4016E−06 | −4.2357E−06 | −1.7720E−05 | 3.6545E−05 | −2.0709E−04 |

| | Surface # | | | | |
|---|---|---|---|---|---|
| 8 | 9 | 10 | 11 | 12 | 13 |
| k = 4.4138E+00 | 6.4677E−02 | −4.7201E+00 | −4.8296E+01 | −1.2627E+01 | 2.0000E+01 |
| A4 = 2.0308E−03 | −4.7348E−03 | −7.5411E−03 | 6.5145E−02 | −1.4768E−02 | −2.6485E−02 |
| A6 = −1.3278E−03 | 1.7294E−03 | −3.6584E−02 | −4.3792E−02 | 6.6036E−03 | 1.1464E−02 |
| A8 = 9.0470E−04 | 5.3154E−04 | 4.9122E−02 | 2.8391E−02 | −3.0413E−03 | −6.7129E−03 |
| A10 = −1.7881E−04 | −5.6773E−05 | −3.9780E−02 | −1.4044E−02 | 6.7348E−04 | 2.3911E−03 |
| A12 = 2.4129E−05 | 1.7976E−06 | 1.8125E−02 | 4.4302E−03 | −2.0884E−06 | −5.2352E−04 |
| A14 = | | −4.2957E−03 | −7.6283E−04 | −1.4908E−05 | 6.8101E−05 |
| A16 = | | 4.1324E−04 | 5.4054E−05 | 1.2043E−06 | −3.8356E−06 |

In the wide-angle optical lens assembly according to the 6th embodiment, the equation of the aspheric surface and the definitions of f, Fno, HFOV, CT1, CT2, ET45, T12, T23, T34, T45, T56, R1, R2, R3, R4, R5, R6, R8, R9, f3, ff, fr, Dr1s, Dsr12, Yc22 and FOV are the same as those stated in the 1st embodiment with corresponding values for the 6th embodiment. Moreover, these parameters can be calculated from Tables 11 and 12 as the following values and satisfy the following relationships:

| 6th embodiment | |
|---|---|
| f (mm) | 2.59 |
| Fno | 2.08 |
| HFOV (degrees) | 48.8 |
| CT2/CT1 | 0.61 |

-continued

| 6th embodiment | | | |
|---|---|---|---|
| (R5 + R6)/(R5 − R6) | 0.84 | | |
| |R9/R8| | 0.54 | | |
| f/f3 | 0.46 | | |
| f/ff | 0.65 | | |
| ET45/T45 | 0.44 | ff/fr | 0.37 |
| (T23 + T34 + T45 + T56)/T12 | 0.46 | Dr1s/Dsr12 | 1.39 |
| (R1 + R2)/(R1 − R2) | 1.35 | Yc22/f | 0.70 |
| (R3 − R4)/(R3 + R4) | 0.01 | FOV (degrees) | 97.6 |

7th Embodiment

Figure 13:
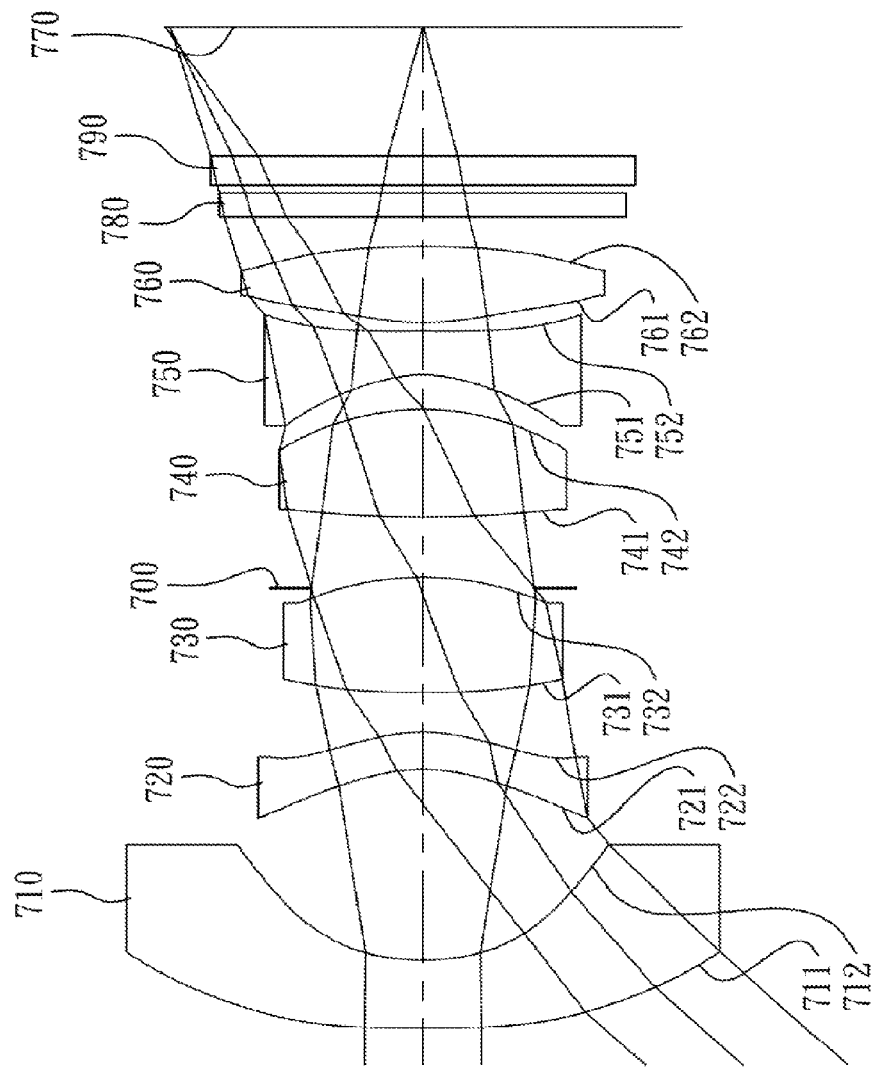
FIG. 13 is a schematic diagram of a wide-angle optical lens assembly according to the 7th embodiment of the present disclosure.
Figure 14:
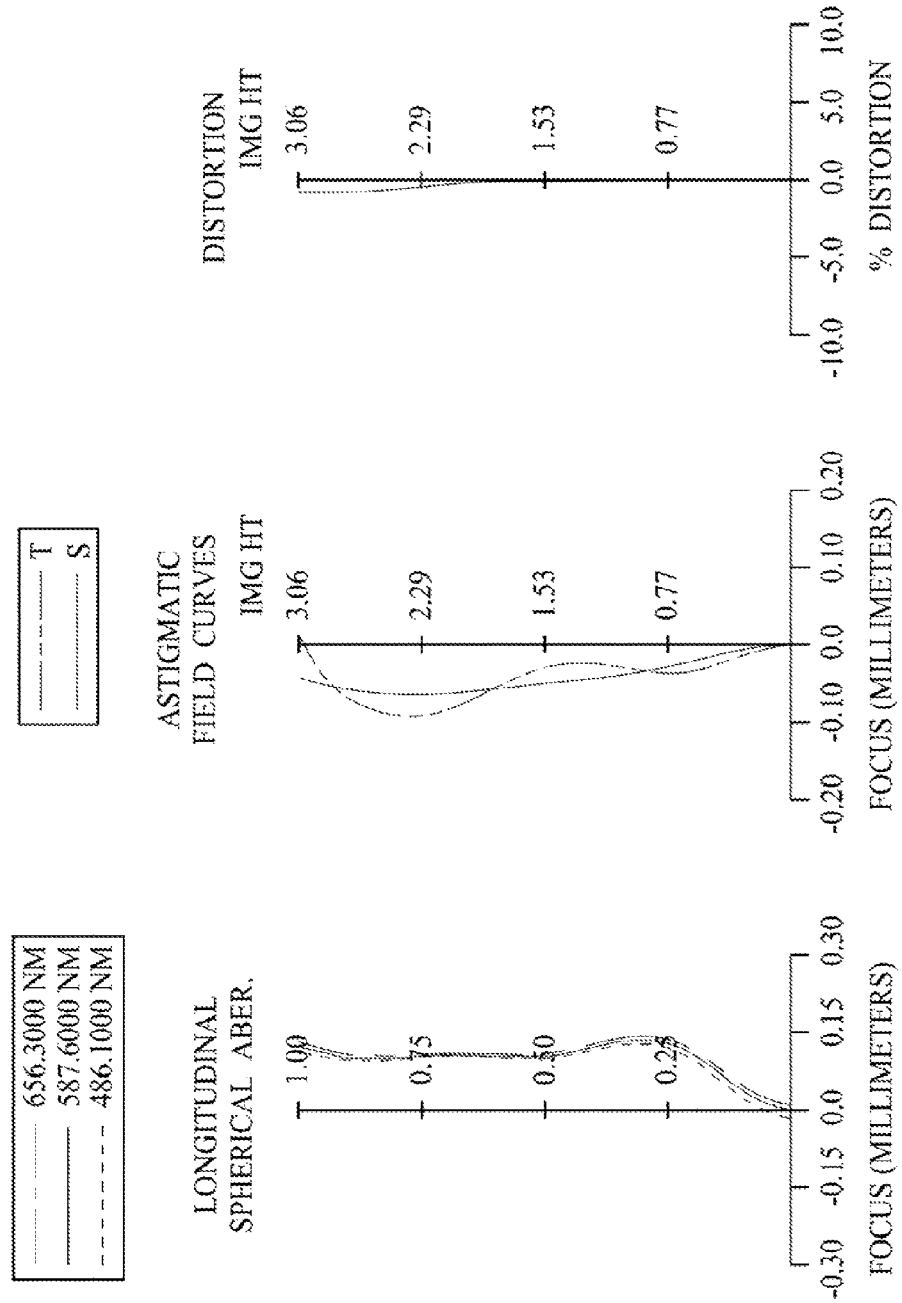
FIG. 14 shows spherical aberration curves, astigmatic field curves and a distortion curve of the wide-angle optical lens assembly according to the 7th embodiment.
Figure 25:
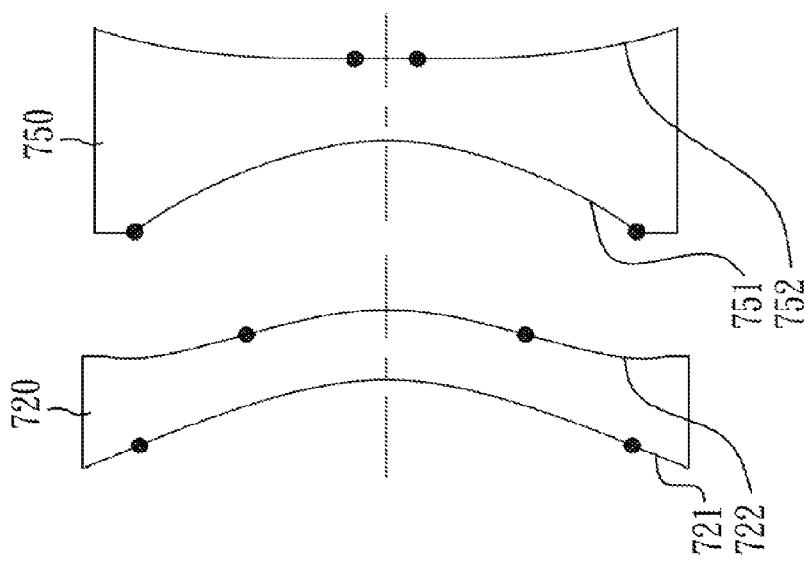
FIG. 25 is an enlarged view of the second lens element 720 and the fifth lens element 750 of the wide-angle optical lens assembly of FIG. 13.

FIG. 13 is a schematic diagram of a wide-angle optical lens assembly according to the 7th embodiment of the present disclosure. FIG. 14 shows spherical aberration curves, astigmatic field curves and a distortion curve of the wide-angle optical lens assembly according to the 7th embodiment. FIG. 25 is an enlarged view of the second lens element 720 and the fifth lens element 750 of the wide-angle optical lens assembly of FIG. 13. In FIG. 13, the wide-angle optical lens assembly includes, in order from an object side to an image side, a first lens element 710, a second lens element 720, a third lens element 730, an aperture stop 700, a fourth lens element 740, a fifth lens element 750, a sixth lens element 760, an IR-cut filter 780, a cover glass 790, and an image plane 770. The first lens element 710, the second lens element 720, and the third lens element 730 are belonged to a front lens group, and the fourth lens element 740, the fifth lens element 750, and the sixth lens element 760 are belonged to a rear lens group.

The first lens element 710 with negative refractive power has a convex object-side surface 711 and a concave image-side surface 712 and is made of plastic material. The object-side surface 711 and the image-side surface 712 of the first lens element 710 are both aspheric.

The second lens element 720 with positive refractive power has a concave object-side surface 721 and a convex image-side surface 722, and is made of plastic material. The object-side surface 721 and the image-side surface 722 of the second lens element 720 are both aspheric. Furthermore, the second lens element 720 has inflection points on the object-side surface 721 and the image-side surface 722 thereof.

The third lens element 730 with positive refractive power has a convex object-side surface 731 and a convex image-side surface 732, and is made of plastic material. The object-side surface 731 and the image-side surface 732 of the third lens element 730 are both aspheric.

The fourth lens element 740 with positive refractive power has a convex object-side surface 741 and a convex image-side surface 742, and is made of glass.

The fifth lens element 750 with negative refractive power has a concave object-side surface 751 and a convex image-side surface 752, and is made of plastic material. The object-side surface 751 and the mage-side surface 752 of the fifth lens element 750 are both aspheric. Furthermore, the fifth lens element 750 has inflection points on the object-side surface 751 and the image-side surface 752 thereof.

The sixth lens element 760 with positive refractive power has a convex object-side surface 761 and a convex image-side surface 762, and is made of plastic material. The object-side surface 761 and the image-side surface 762 of the sixth lens element 760 are both aspheric.

The IR-cut filter 780 made of glass is disposed between the sixth lens element 760 and the image plane 770 with the cover glass 790 in order, and they will not affect the focal length of the wide-angle optical lens assembly.

The detailed optical data of the 7th embodiment are shown in Table 13, and the aspheric surface data are shown in Table 14 below.

TABLE 13

7th Embodiment
f = 2.93 mm, Fno = 2.08, HFOV = 46.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 115.387 (ASP) | 0.889 | Plastic | 1.530 | 55.8 | −5.36 |
| 2 | | 2.767 (ASP) | 2.519 | | | | |
| 3 | Lens 2 | −1.955 (ASP) | 0.500 | Plastic | 1.583 | 30.2 | 19.37 |
| 4 | | −1.824 (ASP) | 0.520 | | | | |
| 5 | Lens 3 | 101.847 (ASP) | 1.516 | Plastic | 1.530 | 55.8 | 5.94 |
| 6 | | −3.234 (ASP) | −0.142 | | | | |
| 7 | Ape. Stop | Plano | 0.946 | | | | |
| 8 | Lens 4 | 13.326 | 1.418 | Glass | 1.589 | 61.3 | 4.34 |
| 9 | | −3.037 | 0.453 | | | | |
| 10 | Lens 5 | −1.553 (ASP) | 0.583 | Plastic | 1.632 | 23.4 | −2.59 |
| 11 | | −35.396 (ASP) | 0.114 | | | | |
| 12 | Lens 6 | 2.865 (ASP) | 1.000 | Plastic | 1.530 | 55.8 | 4.64 |
| 13 | | −15.328 (ASP) | 0.400 | | | | |
| 14 | IR-cut filter | Plano | 0.300 | Glass | 1.517 | 64.2 | — |
| 15 | | Plano | 0.100 | | | | |
| 16 | Cover glass | Plano | 0.400 | Glass | 1.517 | 64.2 | — |
| 17 | | Plano | 1.707 | | | | |
| 18 | Image | Plano | — | | | | |

Note:
Reference wavelength (d-line) is 587.6 nm.

TABLE 14

Aspheric Coefficients

| Surface # | 1 | 2 | 3 | 4 | 5 |
|---|---|---|---|---|---|
| k = | −1.0000E+01 | −9.0974E−01 | −3.6626E+00 | −5.6849E+00 | 2.0000E+01 |
| A4 = | 2.3683E−02 | 3.6901E−02 | 3.7032E−05 | −4.6717E−03 | 6.9767E−02 |
| A6 = | −4.4242E−03 | 4.7567E−03 | 1.6311E−02 | 3.2698E−02 | −4.8642E−02 |
| A8 = | 6.0152E−04 | −5.2174E−03 | −1.5064E−02 | −2.3956E−02 | 2.6098E−02 |
| A10 = | −6.1003E−05 | 2.0848E−03 | 5.9231E−03 | 9.4515E−03 | −1.0857E−02 |
| A12 = | 4.1800E−06 | −5.1750E−04 | −1.1603E−03 | −2.1002E−03 | 3.0796E−03 |
| A14 = | −1.6270E−07 | 6.7258E−05 | 1.1169E−04 | 2.7754E−04 | −5.0589E−04 |
| A16 = | 2.6776E−09 | −3.4367E−06 | −4.2269E−06 | −1.7860E−05 | 3.6995E−05 |

| Surface # | 6 | 10 | 11 | 12 | 13 |
|---|---|---|---|---|---|
| k = | −4.9430E+01 | −5.5581E+00 | 5.3152E+00 | −1.5061E+01 | 2.5652E+00 |
| A4 = | −1.2660E−01 | −5.0647E−03 | 6.2647E−02 | −1.3352E−02 | −2.3366E−02 |

TABLE 14-continued

| Aspheric Coefficients | | | | |
|---|---|---|---|---|
| A6 =  | 1.4085E−01 | −3.6474E−02 | −4.3566E−02 | 6.7900E−03 | 1.2726E−02 |
| A8 =  | −1.1649E−01 | 4.9002E−02 | 2.8443E−02 | −3.0264E−03 | −6.7181E−03 |
| A10 = | 6.1592E−02 | −3.9721E−02 | −1.4040E−02 | 6.6473E−04 | 2.3621E−03 |
| A12 = | −1.9353E−02 | 1.8123E−02 | 4.4322E−03 | −3.0602E−06 | −5.2293E−04 |
| A14 = | 3.2269E−03 | −4.2960E−03 | −7.6265E−04 | −1.4898E−05 | 6.8187E−05 |
| A16 = | −2.1029E−04 | 4.1339E−04 | 5.4025E−05 | 1.2408E−06 | −3.8475E−06 |

In the wide-angle optical lens assembly according to the 7th embodiment, the equation of the aspheric surface and the definitions of f, Fno, HFOV, CT1, CT2, ET45, T12, T23, T34, T45, T56, R1, R2, R3, R4, R5, R6, R8, R9, f3, ff, fr, Dr1s, Dsr12, Yc22 and FOV are the same as those stated in the 1st embodiment with corresponding values for the 7th embodiment. Moreover, these parameters can be calculated from Tables 13 and 14 as the following values and satisfy the following relationships:

| 7th embodiment | | | |
|---|---|---|---|
| f (mm) | 2.93 | (R5 + R6)/(R5 − R6) | 0.94 |
| Fno | 2.08 | |R9/R8| | 0.51 |
| HFOV (degrees) | 46.0 | f/f3 | 0.49 |
| CT2/CT1 | 0.56 | f/ff | 0.62 |
| ET45/T45 | 0.73 | ff/fr | 0.46 |
| (T23 + T34 + T45 + T56)/T12 | 0.75 | Dr1s/Dsr12 | 1.29 |
| (R1 + R2)/(R1 − R2) | 1.05 | Yc22/f | 0.57 |
| (R3 − R4)/(R3 + R4) | 0.03 | FOV (degrees) | 92.0 |

8th Embodiment

Figure 15:
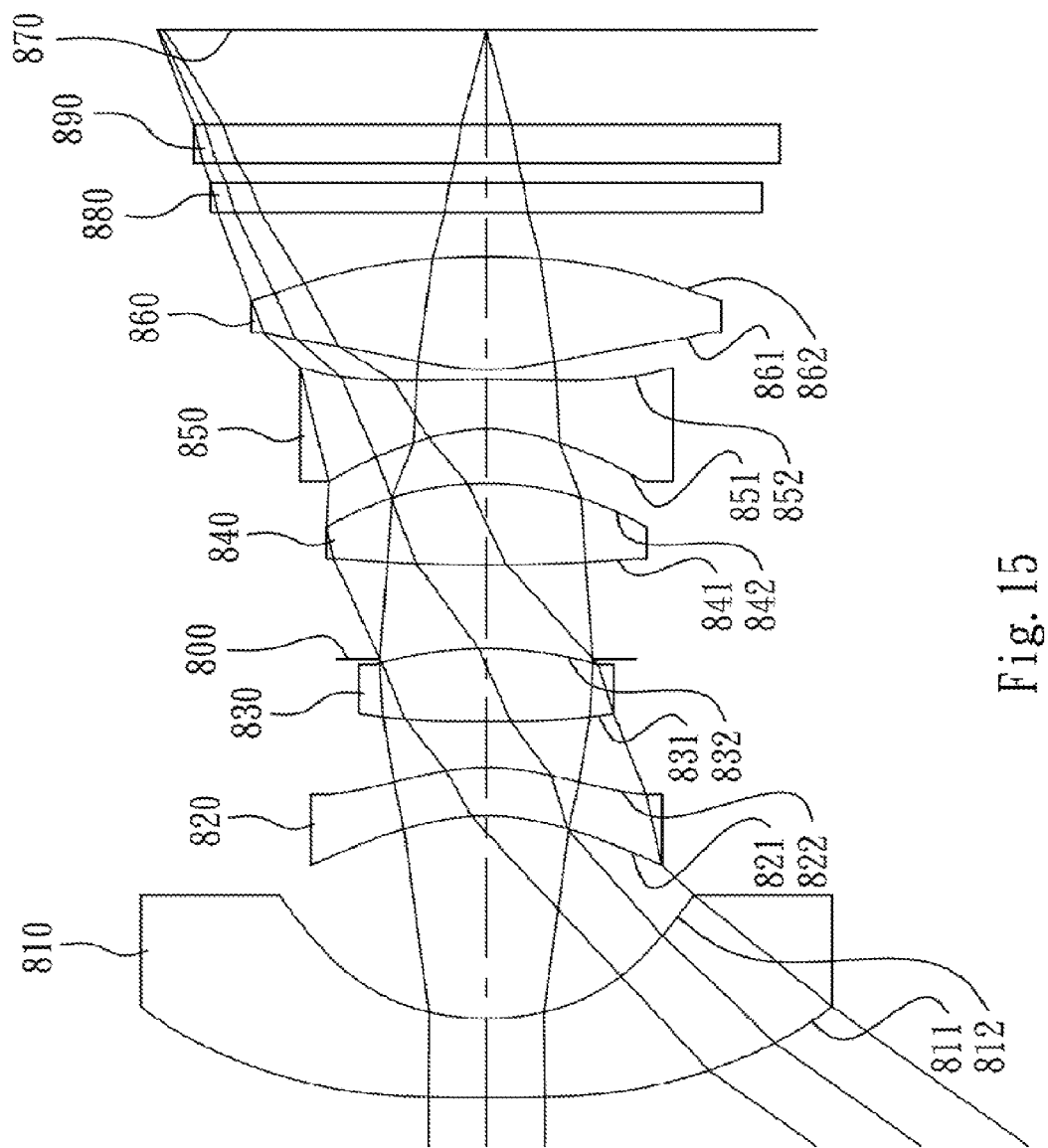
FIG. 15 is a schematic diagram of a wide-angle optical lens assembly according to the 8th embodiment of the present disclosure.
Figure 16:
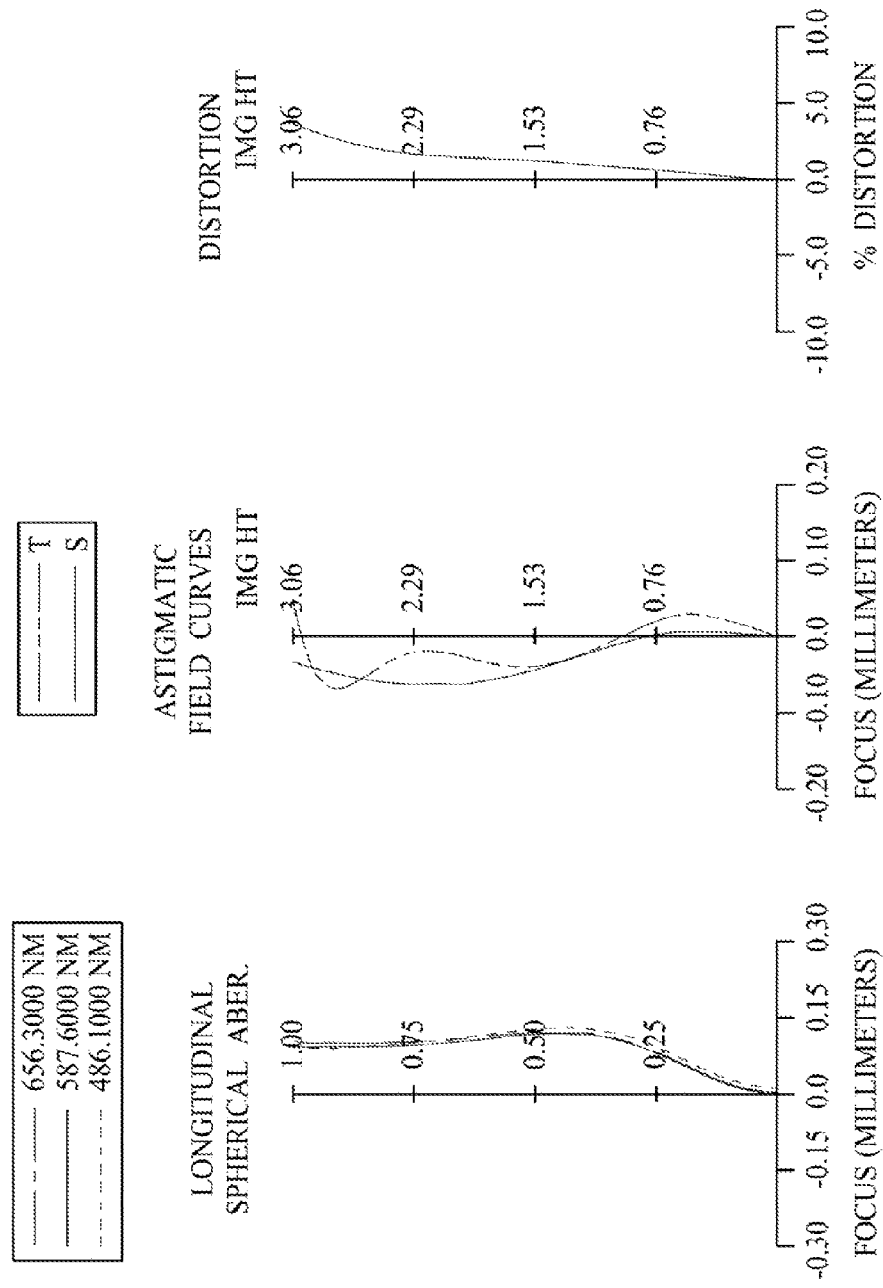
FIG. 16 shows spherical aberration curves, astigmatic field curves and a distortion curve of the wide-angle optical lens assembly according to the 8th embodiment.
Figure 26:
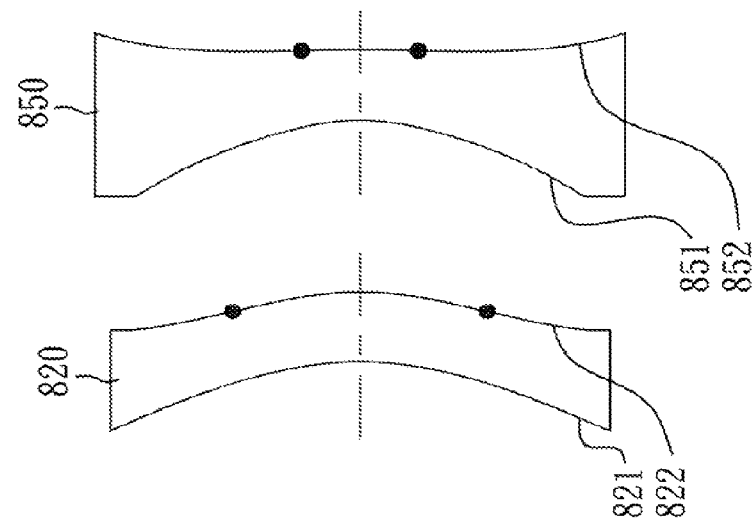
FIG. 26 is an enlarged view of the second lens element 820 and the fifth lens element 850 of the wide-angle optical lens assembly of FIG. 15.

FIG. 15 is a schematic diagram of a wide-angle optical lens assembly according to the 8th embodiment of the present disclosure. FIG. 16 shows spherical aberration curves, astigmatic field curves and a distortion curve of the wide-angle optical lens assembly according to the 8th embodiment. FIG. 26 is an enlarged view of the second lens element 820 and the fifth lens element 850 of the wide-angle optical lens assembly of FIG. 15. In FIG. 15, the wide-angle optical lens assembly includes, in order from an object side to an image side, a first lens element 810, a second lens element 820, a third lens element 830, an aperture stop 800, a fourth lens element 840, a fifth lens element 850, a sixth lens element 860, an IR-cut filter 880, a cover glass 890, and an image plane 870. The first lens element 810, the second lens element 820, and the third lens element 830 are belonged to a front lens group, and the fourth lens element 840, the fifth lens element 850, and the sixth lens element 860 are belonged to a rear lens group.

The first lens element 810 with negative refractive power has a convex object-side surface 811 and a concave image-side surface 812, and is made of plastic material. The object-side surface 811 and the mage-side surface 812 of the first lens element 810 are both aspheric.

The second lens element 820 with positive refractive power has a concave object-side surface 821 and a convex image-side surface 822, and is made of plastic material. The object-side surface 821 and the image-side surface 822 of the second lens element 820 are both aspheric. Furthermore, the second lens element 820 has inflection points on the image-side surface 822 thereof.

The third lens element 830 with positive refractive power has a convex object-side surface 831 and a convex image-side surface 832, and is made of plastic material. The object-side surface 831 and the image-side surface 832 of the third lens element 830 are both aspheric.

The fourth lens element 840 with positive refractive power has a convex object-side surface 841 and a convex image-side surface 842, and is made of glass.

The fifth lens element 850 with negative refractive power has a concave object-side surface 851 and a convex image-side surface 852, and is made of plastic material. The object-side surface 851 and the image-side surface 852 of the fifth lens element 850 are both aspheric. Furthermore, the fifth lens element 850 has inflection points on the image-side surface 852 thereof.

The sixth lens element 860 with positive refractive power has a convex object-side surface 861 and a convex image-side surface 862, and is made of plastic material. The object-side surface 861 and the image-side surface 862 of the sixth lens element 860 are both aspheric.

The IR-cut filter 880 made of glass is disposed between the sixth lens element 860 and the image plane 870 with the cover glass 890 in order, and they will not affect the focal length of the wide-angle optical lens assembly.

The detailed optical data of the 8th embodiment are shown in Table 15, and the aspheric surface data are shown in Table 16 below.

TABLE 15

8th Embodiment
f = 2.26 mm, Fno = 2.08, HFOV = 52.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 49.334 (ASP) | 0.800 | Plastic | 1.530 | 55.8 | −4.67 |
| 2 | | 2.346 (ASP) | 2.066 | | | | |
| 3 | Lens 2 | −2.024 (ASP) | 0.500 | Plastic | 1.543 | 56.5 | 26.08 |
| 4 | | −1.925 (ASP) | 0.466 | | | | |
| 5 | Lens 3 | 38.978 (ASP) | 0.747 | Plastic | 1.530 | 55.8 | 5.58 |
| 6 | | −3.181 (ASP) | −0.106 | | | | |
| 7 | Ape. Stop | Plano | 0.961 | | | | |
| 8 | Lens 4 | 15.711 | 0.825 | Glass | 1.622 | 53.2 | 3.83 |
| 9 | | −2.752 | 0.564 | | | | |

TABLE 15-continued

8th Embodiment
f = 2.26 mm, Fno = 2.08, HFOV = 52.1 deg.

| Surface # | | Curvature Radius | Thickness | Material | Index | Abbe # | Focal length |
|---|---|---|---|---|---|---|---|
| 10 | Lens 5 | −1.272 (ASP) | 0.500 | Plastic | 1.650 | 21.4 | −2.29 |
| 11 | | −10.028 (ASP) | 0.100 | | | | |
| 12 | Lens 6 | 1.943 (ASP) | 1.156 | Plastic | 1.530 | 55.8 | 2.99 |
| 13 | | −6.779 (ASP) | 0.450 | | | | |
| 14 | IR-cut filter | Plano | 0.300 | Glass | 1.517 | 64.2 | — |
| 15 | | Plano | 0.200 | | | | |
| 16 | Cover glass | Plano | 0.400 | Glass | 1.517 | 64.2 | — |
| 17 | | Plano | 0.965 | | | | |
| 18 | Image | Plano | — | | | | |

Note:
Reference wavelength (d-line) is 587.6 nm.

TABLE 16

Aspheric Coefficients

| Surface # | 1 | 2 | 3 | 4 | 5 |
|---|---|---|---|---|---|
| k = | 1.0000E+01 | −7.1166E−01 | −3.1819E+00 | −6.9660E+00 | −7.2799E+01 |
| A4 = | 2.3990E−02 | 3.6548E−02 | −5.9069E−04 | −2.3351E−03 | 6.8851E−02 |
| A6 = | −4.4211E−03 | 5.7988E−03 | 1.6230E−02 | 3.3150E−02 | −4.9800E−02 |
| A8 = | 6.0409E−04 | −5.2099E−03 | −1.5080E−02 | −2.3868E−02 | 2.5749E−02 |
| A10 = | −6.0862E−05 | 2.0670E−03 | 5.9204E−03 | 9.4665E−03 | −1.0921E−02 |
| A12 = | 4.1886E−06 | −5.2195E−04 | −1.1600E−03 | −2.1016E−03 | 3.0943E−03 |
| A14 = | −1.6226E−07 | 6.6461E−05 | 1.1188E−04 | 2.7652E−04 | −4.9383E−04 |
| A16 = | 2.7016E−09 | −3.5687E−06 | −4.1515E−06 | −1.8427E−05 | 4.8528E−05 |

| Surface # | 6 | 10 | 11 | 12 | 13 |
|---|---|---|---|---|---|
| k = | −4.9854E+01 | −5.9999E+00 | −3.0000E+01 | −1.3720E+01 | −8.6402E−01 |
| A4 = | −1.2637E−01 | −4.7753E−03 | 6.5712E−02 | −1.3541E−02 | −1.9609E−02 |
| A6 = | 1.4069E−01 | −3.6648E−02 | −4.3012E−02 | 6.6204E−03 | 1.2702E−02 |
| A8 = | −1.1662E−01 | 4.8991E−02 | 2.8514E−02 | −3.0431E−02 | −6.7359E−03 |
| A10 = | 6.1544E−02 | −3.9699E−02 | −1.4035E−02 | 6.6507E−04 | 2.3591E−03 |
| A12 = | −1.9220E−02 | 1.8126E−02 | 4.4318E−03 | −3.3237E−06 | −5.2337E−04 |
| A14 = | 3.2711E−03 | −4.2945E−03 | −7.6293E−04 | −1.4938E−05 | 6.8163E−05 |
| A16 = | −1.3128E−04 | 4.1361E−04 | 5.3911E−05 | 1.2356E−06 | −3.8474E−06 |

In the wide-angle optical lens assembly according to the 8th embodiment, the equation of the aspheric surface and the definitions of f, Fno, HFOV, CT1, CT2, ET45, T12, T23, T34, T45, T56, R1, R2, R3, R4, R5, R6, R8, R9, f3, ff, fr, Dr1s, Dsr12, Yc22 and FOV are the same as those stated in the 1st embodiment with corresponding values for the 8th embodiment. Moreover, these parameters can be calculated from Tables 15 and 16 as the following values and satisfy the following relationships:

| 8th embodiment | | | |
|---|---|---|---|
| f (mm) | 2.26 | (R5 + R6)/(R5 − R6) | 0.85 |
| Fno | 2.08 | |R9/R8| | 0.46 |
| HFOV (degrees) | 52.1 | f/f3 | 0.41 |
| CT2/CT1 | 0.63 | f/ff | 0.40 |
| ET45/T45 | 0.81 | ff/fr | 1.13 |
| (T23 + T34 + T45 + T56)/T12 | 0.96 | Dr1s/Dsr12 | 1.09 |
| (R1 + R2)/(R1 − R2) | 1.10 | Yc22/f | — |
| (R3 − R4)/(R3 + R4) | 0.03 | FOV (degrees) | 104.2 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wide-angle optical lens assembly comprising, in order from an object side to an image side:
a first lens element with negative refractive power having a concave image-side surface;
a second lens element with refractive power having a concave object-side surface and a convex image-side surface;
a third lens element with positive refractive power;
a fourth lens element with positive refractive power;
a fifth lens element with refractive power having an object-side surface and an image-side surface which are both aspheric; and
a sixth lens element with refractive power having a convex object-side surface, wherein the object-side surface and an image-side surface of the sixth lens element are both aspheric;
wherein at least one of the second lens element and the fifth lens element has at least one inflection point on at least one surface thereof, the wide-angle optical lens assembly further comprises a stop disposed between the third lens element and the fourth lens element, a composite focal length of the lens elements with refractive power disposed between the stop and an object is ff, a composite focal length of the lens elements with refractive power disposed between the stop and an image plane is fr, a focal length of the wide-angle optical lens assembly is f, a focal length of the third lens element is f3, and the following relationships are satisfied:

0<ff/fr<3.0; and 0.2≤f/f3<1.5.

2. The wide-angle optical lens assembly of claim 1, wherein the fourth lens element has a convex image-side surface, the fifth lens element has negative refractive power, and the object-side surface of the fifth lens element is concave.

3. The wide-angle optical lens assembly of claim 2, wherein the image-side surface of the fifth lens element is convex.

4. The wide-angle optical lens assembly of claim 2, wherein a curvature radius of the object-side surface of the second lens element is R3, a curvature radius of the image-side surface of the second lens element is R4, and the following relationship is satisfied:

−0.3<(R3−R4)/(R3+R4)<0.3.

5. The wide-angle optical lens assembly of claim 2, wherein the object-side surface and the image-side surface of the second lens element are both aspheric, a curvature radius of an object-side surface of the third lens element is R5, a curvature radius of an image-side surface of the third lens element is R6, and the following relationship is satisfied:

−1.3<(R5+R6)/(R5−R6)<1.3.

6. The wide-angle optical lens assembly of claim 5, wherein the sixth lens element has positive refractive power; a curvature radius of an object-side surface of the first lens element is R1, a curvature radius of the image-side surface of the first lens element is R2, and the following relationship is satisfied:

0.9<(R1+R2)/(R1−R2)<2.0.

7. The wide-angle optical lens assembly of claim 2, wherein a curvature radius of the image-side surface of the fourth lens element is R8, a curvature radius of the object-side surface of the fifth lens element is R9, and the following relationship is satisfied:

|R9/R8|<0.9.

8. The wide-angle optical lens assembly of claim 2, wherein the focal length of the wide-angle optical lens assembly is f, a distance perpendicular to an optical axis between a critical point on the image-side surface of the second lens element and the optical axis is Yc22, and the following relationship is satisfied:

0.1<Yc22/f<1.2.

9. The wide-angle optical lens assembly of claim 8, wherein the focal length of the wide-angle optical lens assembly is f, the composite focal length of the lens elements with refractive power disposed between the stop and the object is ff, and the following relationship is satisfied:

0.4≤f/ff<0.9.

10. The wide-angle optical lens assembly of claim 8, wherein an axial distance from an object-side surface of the first lens element to the stop is Dr1s, an axial distance from the stop to the image-side surface of the sixth lens element is Dsr12, and the following relationship is satisfied:

0.8<Dr1s/Dsr12<1.5.

11. The wide-angle optical lens assembly of claim 10, wherein a central thickness of the first lens element is CT1, a central thickness of the second lens element is CT2, and the following relationship is satisfied:

0.3<CT2/CT1<0.9.

12. The wide-angle optical lens assembly of claim 2, wherein the sixth lens element has positive refractive power, the composite focal length of the lens elements with refractive power disposed between the stop and the object is ff, the composite focal length of the lens elements with refractive power disposed between the stop and the image plane is fr, and the following relationship is satisfied:

0.2<ff/fr<9.

13. The wide-angle optical lens assembly of claim 12, wherein the composite focal length of the lens elements with refractive power disposed between the stop and the object is ff, the composite focal length of the lens elements with refractive power disposed between the stop and the image plane is fr, and the following relationship is satisfied:

0.3<ff/fr<0.7.

14. The wide-angle optical lens assembly of claim 12, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following relationship is satisfied:

0.1<(T23+T34+T45+T56)/T12<0.65.

15. The wide-angle optical lens assembly of claim 12, wherein a distance in parallel with an optical axis between a maximum effective diameter position on the image-side surface of the fourth lens element and a maximum effective diameter position on the object-side surface of the fifth lens element is ET45, an axial distance between the fourth lens element and the fifth lens element is T45, and the following relationship is satisfied:

0.05<ET45/T45<0.9.

16. A wide-angle optical lens assembly comprising, in order from an object side to an image side:
  a first lens element with negative refractive power having a concave image-side surface;
  a second lens element with refractive power having a concave object-side surface and a convex image-side surface;
  a third lens element with refractive power;
  a fourth lens element with positive refractive power;
  a fifth lens element with negative refractive power having a concave object-side surface; and
  a sixth lens element with refractive power having an object-side surface and an image-side surface which are both aspheric;
  wherein an air distance exists between any two of the lens elements with refractive power, the wide-angle optical lens assembly further comprises a stop disposed between the third lens element and the fourth lens element, a composite focal length of the lens elements with refractive power disposed between the stop and an object is ff, a composite focal length of the lens elements with refractive power disposed between the stop and an image plane is fr, a central thickness of the first lens element is CT1, a central thickness of the second lens element is CT2, and the following relationships are satisfied:

$0 < f\!f/fr < 3.0$; and $0.2 < CT2/CT1 < 1.5$.

17. The wide-angle optical lens assembly of claim 16, wherein the sixth lens element has positive refractive power, an axial distance from an object-side surface of the first lens element to the stop is Dr1s, an axial distance from the stop to the image-side surface of the sixth lens element is Dsr12, and the following relationship is satisfied:

$0.8 < Dr1s/Dsr12 < 1.5$.

18. The wide-angle optical lens assembly of claim 17, wherein at least half of the lens elements with refractive power are made of plastic material, a focal length of the wide-angle optical lens assembly is f, a focal length of the third lens element is f3, and the following relationship is satisfied:

$0.4 < f/f3 < 0.8$.

19. The wide-angle optical lens assembly of claim 17, wherein a curvature radius of an image-side surface of the fourth lens element is R8, a curvature radius of the object-side surface of the fifth lens element is R9, and the following relationship is satisfied:

$|R9/R8| < 0.9$.

20. The wide-angle optical lens assembly of claim 16, wherein the fifth lens element has a convex image-side surface.

21. The wide-angle optical lens assembly of claim 20, wherein the fifth lens element has at least one inflection point on the image-side surface thereof.

22. The wide-angle optical lens assembly of claim 20, wherein a curvature radius of the object-side ace of the second lens element is R3, a curvature radius of the image-side surface of the second lens element is R4, and the following relationship is satisfied:

$-0.3 < (R3-R4)/(R3+R4) < 0.3$.

23. The wide-angle optical lens assembly of claim 16, wherein a focal length of the wide-angle optical lens assembly is f, a distance perpendicular to an optical axis between a critical point on the image-side surface of h second lens element and the optical axis is Yc22, and the following relationship is satisfied:

$0.1 < Yc22/f < 1.2$.

24. A wide-angle optical lens assembly comprising, in order from an object side to an image side:
  a front lens group with positive refractive power comprising, in order from the object side to the image side:
    a first lens element with negative refractive power having a concave image-side surface;
    a second lens element with refractive power having a concave object-side surface and a convex image-side surface, wherein the object-side surface and the image-side surface of the second lens element are both aspheric; and
    a third lens element with refractive power;
  a stop; and
  a rear lens group with positive refractive power comprising, in order from the object side to the image side:
    a fourth lens element with positive refractive power having a convex image-side surface;
    a fifth lens element with negative refractive power having an object-side surface and an image-side surface which are both aspheric; and
    a sixth lens element with refractive power having an object-side surface and an image-side surface which are both aspheric;
  wherein at least half of the lens elements with refractive power of the wide-angle optical lens assembly are made of plastic material, a composite focal length of the lens elements with refractive power in the front lens group is ff, a composite focal length of the lens elements with refractive power in the rear lens group is fr, and the following relationship is satisfied:

$0 < f\!f/fr < 3.0$.

25. The wide-angle optical lens assembly of claim 24, wherein the composite focal length of the lens elements with refractive power in the front lens group is ff, the composite focal length of the lens elements with refractive power in the rear lens group is fr, and the following relationship is satisfied:

$0.2 < f\!f/fr < 0.9$.

26. The wide-angle optical lens assembly of claim 24, wherein a curvature radius of the image-side surface of the fourth lens element is R8, a curvature radius of the object-side surface of the fifth lens element is R9, and the following relationship is satisfied:

$|R9/R8| < 0.9$.

27. The wide-angle optical lens assembly of claim 24, wherein the third lens element has positive refractive power, the sixth lens element has positive refractive power, and the object-side surface of the sixth lens element is convex.

28. The wide-angle optical lens assembly of claim 27, wherein a curvature radius of the object-side surface of the second lens element is R3, a curvature radius of the image-side surface of the second lens element is R4, and the following relationship is satisfied:

$-0.3 < (R3-R4)/(R3+R4) < 0.3$.

29. The wide-angle optical lens assembly of claim 27, wherein a maximal field of view of the wide-angle optical lens assembly is FOV, and the following relationship is satisfied:

80 degrees < FOV < 160 degrees.

* * * * *

UNITED STATES PATENT AND TRADEMARK OFFICE
CERTIFICATE OF CORRECTION

| | | |
|---|---|---|
| PATENT NO. | : 9,103,962 B2 | Page 1 of 1 |
| APPLICATION NO. | : 13/669449 | |
| DATED | : August 11, 2015 | |
| INVENTOR(S) | : Lin-Yao Liao and Hsin-Hsuan Huang | |

It is certified that error appears in the above-identified patent and that said Letters Patent is hereby corrected as shown below:

In The Claims

In column 34, line 18, Claim 12 of the issued patent reads as "$0.2<ff/fr<9$", but it should read as "$0.2<ff/fr<0.9$".

In column 35, line 49, Claim 23 of the issued patent reads as "of h second lens element", but it should read as "of the second lens element".

Signed and Sealed this
Twenty-sixth Day of January, 2016

Michelle K. Lee
*Director of the United States Patent and Trademark Office*